(12) United States Patent
Carrillo De La Fuente

(10) Patent No.: US 9,374,226 B2
(45) Date of Patent: Jun. 21, 2016

(54) PROTECTION METHOD AND SYSTEM FOR DISTRIBUTING DIGITAL FILES WHETHER NEW, SECOND-HAND, FOR RENTAL, EXCHANGE OR TRANSFER

(76) Inventor: Miguel Angel Carrillo De La Fuente, Madrid (ES)

( * ) Notice: Subject to any disclaimer, the term of this patent is extended or adjusted under 35 U.S.C. 154(b) by 0 days.

(21) Appl. No.: 14/388,758

(22) PCT Filed: Mar. 27, 2012

(86) PCT No.: PCT/ES2012/070208
§ 371 (c)(1),
(2), (4) Date: Sep. 26, 2014

(87) PCT Pub. No.: WO2013/144384
PCT Pub. Date: Oct. 3, 2013

(65) Prior Publication Data
US 2015/0117641 A1     Apr. 30, 2015

(51) Int. Cl.
 *H04L 29/06*     (2006.01)
 *H04L 9/32*      (2006.01)
 *H04L 9/00*      (2006.01)
 (Continued)

(52) U.S. Cl.
 CPC .......... *H04L 9/3247* (2013.01); *G06F 21/6209* (2013.01); *G06F 21/6218* (2013.01); *H04L 9/08* (2013.01); *H04L 9/0822* (2013.01); *H04L 9/0825* (2013.01); *H04L 9/0894* (2013.01);
 (Continued)

(58) Field of Classification Search
 CPC ........... H04L 9/08; H04L 9/30; H04L 9/0894; G06F 21/6218; G06F 2221/2107; G06F 21/6209
 USPC .......................... 380/44, 277, 28; 713/165, 171
 See application file for complete search history.

(56) References Cited

U.S. PATENT DOCUMENTS

| 2011/0161680 A1 | 6/2011 | Grube et al. | |
| 2011/0238985 A1* | 9/2011 | Sovio ................. | H04N 21/2347 713/168 |
| 2012/0278634 A1* | 11/2012 | Luukkala ............ | H04L 63/0442 713/189 |

FOREIGN PATENT DOCUMENTS

WO     2005093989 A1     10/2005

OTHER PUBLICATIONS

Yang Liu; Chi Zhang; PengZhou Zhang, "Design of a DRM System for Electronic Document Publication" Second International Workshop on Education Technology and Computer Science (ETCS), 2010; pp. 311-314; ISBN 978-1-4244-6388-6; ISBN 1-4244-6388-2 (Mar. 6, 2010).

*Primary Examiner* — Aravind Moorthy
(74) *Attorney, Agent, or Firm* — Miltons IP/p.i.

(57) ABSTRACT

A method for generating a virtual recursive secure container and for generating a virtual secure container of relationship of rights along with a system that distributes copyrighted digital content, respecting the legal framework for intellectual property when distributed electronically, either on the Internet or any other digital medium, and offering consumers their rights as buyers of digital content.

The logical components, 'Master Avatar' and 'User Avatar', which reside in the users' digital devices, create the virtual framework for relating rights of author and consumer. By providing each avatar with a key to decrypt the data of digital content distributed through the system, the virtual link for relating the rights of author and consumer is created.

Digital content is only distributed in a virtual secure container if the author or a licensed medium previously published that content in the system and authorized its distribution in scenarios allowed by the system.

20 Claims, 9 Drawing Sheets

(51) Int. Cl.
*H04L 9/28* (2006.01)
*G06F 21/62* (2013.01)
*H04L 9/30* (2006.01)
*H04L 9/08* (2006.01)
*G06Q 20/12* (2012.01)

(52) U.S. Cl.
CPC ............... *H04L 9/30* (2013.01); *H04L 63/061* (2013.01); *H04L 63/123* (2013.01); *G06F 2221/2107* (2013.01); *G06Q 20/1235* (2013.01); *H04L 2209/603* (2013.01); *H04L 2463/101* (2013.01)

PROTECTION METHOD AND SYSTEM FOR DISTRIBUTING DIGITAL FILES WHETHER NEW, SECOND-HAND, FOR RENTAL, EXCHANGE OR TRANSFER

TECHNICAL FIELD

The invention refers to the protection and distribution of authored digital contents respecting the legal framework of the intellectual property when it is distributed electronically, either through Internet or through any other digital medium; and offers to consumers their rights as buyers of the digital content.

The digital content can be of several kinds: Electronic book, digital video file, digital music file, software application, computer program, or any digital product needing a digital device for being used and/or enjoyed.

The terms 'digital content', 'digital product' and 'digital file' are used here as synonyms, and any of them refers to any kind of element that has a content needing a digital device for being used and/or played.

The distribution scenarios supplied by the invention are:
'Firsthand' distribution scenario, when a user acquires the digital product through the invention, either directly from the author's publication of from other authorized medium.
'Secondhand' distribution scenario, when a user sells the digital product to other user, so that the former ceases to be able to make use of the digital content.
'Rental' distribution scenario, when an authorized medium proceeds to the rental of digital content to a user.
'Exchange' distribution scenario, when two users exchange their respective digital contents.
'Transfer' distribution scenario, when a user proceeds to a temporary cession of the digital content to other user and no monetary transaction exists between the user transferring the digital content and the user receiving the temporary usage of the digital content. During the period of the temporary cession, the user that transfers the digital content will not be able to make use of the digital content, whereas the user that receives the cession will be able to make use of that content. This distribution scenario also includes the 'Gift' scenario': a digital content is transferred to other user, with no limit set to the duration of the cession.

The invention gives to each digital content the ability of making copies with its own digital fingerprint, that will differentiate it from the rest of copies of the original digital file, as well as from the rest of protected and distributed digital contents.

Each copy of the digital product has its own digital fingerprint, and when distributed to a user it travels protected in a Virtual Secure Container of Relationship of Rights of Author and Consumer, so that the author's rights are always guaranteed, and ensuring that only the user that acquired the digital content through the Invention can make use of the copy of the digital product.

BACKGROUND ART

Digital content has won in popularity over analogical content mainly by two reasons: (1) the advantageous techniques associated with its production, reproduction and handling, and (2) the better quality that is sometimes perceived, over analogical counterparts. Since the birth of personal computers, digital files have become an easy way for copying content an unlimited number of times without suffering any loss in the quality of the copies. Generally, analogical contents loose quality with each generation copied, and frequently also during its normal usage.

Ever since communication through the Internet started, the ways for spreading, promoting and distributing all kind of products and contents have risen exponentially. Internet allows for instantaneous connection with the entire world, allowing communication with people sometimes thousands of kilometers far away from the sender, without that implying any limitation as to the transmission of either the content or the messages. The scenario of artistic expression packaged in a digital content is among the contents that can be communicated through Internet.

Internet allows sharing our artistic creations, interests and cultural likings with anybody connected to a computer in any place of the world; along with the popularization of the tools for sharing files, it has simplified the distribution of the Copyright digital contents.

The industries of music, films and electronic books, among others, are being the first in living this revolution as regards spreading and distributing digital contents. Confronted to a market with such an attractive horizon, it is unavoidable to encounter frequent discussions and even arguments as to the optimal ways for using the Internet for spreading authored digital contents.

In a sometimes quite troublesome sector, it is necessary to have a clear aim, independent from the business models and financial interests that may be at stake. That aim should always pivot around the defense of rights derived from the creation of the digital contents, and especially of the sole creator of the digital content, i.e. the author, though without leaving aside the rights and interests on the consumer/user side.

A wide set of technologies for solving the protection of the intellectual property rights have been defined, designated as 'Intellectual Property Rights Management' (IPRM), 'Digital Property Rights Management' (DPRM), 'Intellectual Property Management' (IPM), 'Rights Management' (RM), and 'Electronic Copyright Management' (CM), referred to here as a whole as 'Digital Rights Management' (DRM).

DRM is a generic word that refers to the technologies for access control used by publishers and owners of the Copyright for limiting the usage of media or digital devices. It can also refer to the restrictions associated to specific instances of digital works or devices.

For digital rights management, for example, it is necessary to take into account: Authentication, licensing, financial management, payments and balances, specification/verification/protection of rights, and of documents, etc. DRM concepts regarding these matters are described in the U.S. Pat. Nos. 5,530,235, 5,634,012, 5,715,403 and 5,629,980.

The availability of multiple, perfect copies of protected material is perceived by the mass-media industry as an obstacle for its operability and revenues, especially in the music, film and video game industries. Those who publish digital material have typical business models that rely on the ability of obtaining a fee for each copy of the digital product, if not for each execution of the work.

DRM was created or designed by publishers of digital contents, with features allowing controlling the duplication and distribution of such contents. The main aim consists in assigning a set of digital rights to the digital content and its later management. The different mechanisms of DRM, designed by several companies, generally share these characteristics:

It is possible to detect who accesses what digital product, when and under which conditions.

Access to the digital content can be allowed or not, according to conditions that may be altered one-sidedly by the provider of the digital product.

When access is authorized, it is under restrictive conditions established only by the provider of the digital content, independently from the legal rights accorded to authors or consumers.

Two basic DRM schemes have been used: Secure Containers and Reliable Systems. A 'secure container' (or simply a digital content encryption) offers a way for keeping the content of the digital product encrypted until a set of licensing conditions is met as well as some terms of the copyright (e.g. pay-per-view). After verifying several conditions and terms with the provider of the digital contents, this is delivered to the user in a transparent way.

Commercial products such as CRYPTOLOPES™ and DIGIBOXES™ implement the scheme of the secure container. The method of the secure container gives a solution for protecting a digital content when delivered by unsecure channels, although it gives no procedure whatsoever for preventing those users who obtained the digital content in a legitimate way may use it afterwards for its redistribution, thereby violating the intellectual property of the owners of the digital contents.

In the method of the 'reliable system', all the system is responsible for avoiding non-authorized usage or distribution of the document. Building a reliable system usually implies the introduction of new hardware such as a secure processor, secure storing and secure presentation devices. This also requires certifying that all software applications executed in 'reliable systems' are also reliable. Although the building of a reliable, hacker-proof system is a real challenge for existing technologies, the market's current trends suggest that systems must be open and reliable.

As regards copyright, most efforts have been centered on creators or authors, leaving consumers' rights aside. When a user acquires an object, service or work, the user acquires certain associated rights. Nevertheless, very often these rights are neither obvious nor explicit, and what's more, new technologies have tolerated forgetfulness about some of the consumers' rights.

An answer should be given to the question 'What is it that a user acquires when buying a scenario of artistic expression packaged in a digital content?' For many years, for example, the music was sold and distributed using vinyl records. Under adequate conditions, vinyl records can last many years (more than the average life span of a human being, for example). Therefore, when buying a vinyl record the consumer is buying the right to listen to it for all its life. At the same time, he has the right to give it away as a gift, or to sell it again.

In the decade of the 1980s, technology changed and the cassette became the most extended way for selling and distributing music. Sadly, cassettes do not have infinite life, nor even as long as vinyl records, but at least it is long enough to prevent users from noticing a shortening in the longevity of their rights as consumers.

Cassettes were followed by optical disks (DVDs (Digital Versatile Disc) and CDs (Compact Disk), etc.), providing better sound but similar problems: the life of the optical disks is even shorter than that of the cassette. But the most important step in that moment was towards digital contents that were not to get old: The sequence of 0s and 1s can be stored 'forever' without loss of quality.

With the arrival of digital contents a new debate appeared: What does a consumer really acquire when buying a digital content? Is it the sequence of 1s and 0s? Or the user only becomes owner of the physical object that contains that sequence?

If the consumer acquires the sequence of 1s and 0s then users should have full rights for using any device for reproducing it, for storing the sequence in a digital device and for moving it to their digital device of choice. Furthermore, nowadays it would be very simple to give a digital content as a gift, just by passing the sequence of 1s and 0s, and later on the digital content of all the digital devices in which there was a copy would be deleted; therefore, there could be an extension or widening of consumers' rights.

That is sadly not the case: Companies dealing with the sale and distribution of authored digital contents make every effort to avoid maintaining consumers' rights when a digital content is acquired. Many current systems limit the transfer of the sequence of 1s and 0s to other devices. There are also limitations for storing, copying or giving away music.

Nevertheless, work has also been done for providing rights to consumers: Patents PCT/US2010/062658 and PCT/US2011/044964 describe a platform commercially known as ReDigi™, where 'secondhand' digital contents (music files) are sold. That platform allows the user to get rid of songs not listened to any more, obtaining instead discounts in the acquisition of new songs. Patent PCT/US2005/043142 allows a market of used digital contents between mobile terminals and a secure electronic storage.

UltraViolet™ (UV) proposes a 100% cloud-based DRM platform that can protect any medium, from films to music, through electronic books or TV series. Through a web interface, UV can authorize up to 12 playing devices. Also, up to 6 users can be viewing the same content simultaneously. Furthermore, user's data remain stored in UV's centralized servers: where and when a certain content was played in this way, and with whom it was shared. Compatibility is a handicap in this DRM platform: Content licensed under UV will only be available in devices supporting it. These include TVs, tablets, hard disks, mobile phones and laptops. Besides, for managing access to licenses most devices are to be connected to the cloud in some way or other.

The IEEE Project P1817—Standard for Consumer-owned Digital Personal Property, works in standards that describe the methods, algorithms, protocols and management strategies that take part in the cryptographic protection of works under Copyright for public distribution, and in preserving consumers' autonomy and privacy. The IEEE is studying a new proposal that could be an alternative to the DRM: DPP (Digital Personal Property). The Digital Personal Property is a system that allows to copy freely but requires a key for accessing the contents. The key cannot be copied but it can be transferred to anybody. The DPP technology works as follows: The protected digital content consists of two elements, a folder with the file in case and a key for accessing it through a link. The folder with the files can be copied and shared without restrictions, but to be able to access its digital content it is necessary to transfer the key, that cannot be copied, only moved.

The main obstacle to overcome for preserving consumers' rights is to ensure that when a user sells, exchanges or gives away a digital content, this content is truly eliminated/deleted from all the digital devices belonging to that user; or even if a copy of the digital content remained in his possession, it would not be possible for him to make use of it.

The aims of the invention are to provide a secure distribution during the delivery of the digital content, a protection of the intellectual property rights of usage identical to when the digital content is distributed in a physical format (printed matter (e.g. books), optical disks (DVDs, CDs, etc.) and allowing for digital contents' distribution scenarios of firsthand, secondhand, rental, exchange and temporary cession or gift through the Invention.

Every digital content distributed by the invention is done under a Virtual Secure Container of Relationship of Rights of Author and Consumer that combines a method for generating a virtual recursive secure container with the usage of two logical components of the Invention: 'Master Avatar' and the 'User Avatar'. The Avatars create the virtual framework of relationship of rights of author and consumer. Master Avatar ensures the rights of author and the User Avatar custodies rights of consumer upon acquisition of digital contents.

DISCLOSURE OF INVENTION

Technical Issues

Nowadays, a consumer has the possibility of selling, exchanging or lending a book, a DVD/CD of music, etc. to other person, transferring all the rights to the new owner of the physical product. Libraries loan books to the users allowing to spread knowledge and culture in a universal way while preserving the Copyright; and in authorized shops the rental of films is allowed, or when two users unanimously decide to exchange a book.

The invention gives a protection of the intellectual property rights of usage identical to when the digital content is distributed in a physical format, and also provides the models for electronic distribution of digital contents (firsthand, secondhand, rental, exchange and temporary cession/gift) respecting in every moment the Copyright, in the same ways as when the digital content is distributed in a physical format.

Solution to Technical Issues

According to the Invention, its described aims are achieved by using cryptographic techniques. The following are used in the invention: Symmetric encryption techniques, asymmetric encryption techniques, cryptographic summary techniques and digital signatures.

The two 'keys' (or 'encryption keys'; both expressions are used here as synonyms) implied by the process of encryption/decryption can be the same or not, depending of the encryption system used.

Symmetric Encryption Techniques

The symmetric encryption techniques allow to encrypt/decrypt messages through the same key.

AES (Advanced Encryption Standard) is one of the more widely used algorithms, because it became standard in 2002. It uses a block size of 128 bits and keys of 128, 192 or 256 bits.

AES is fast by software as by hardware, relatively easy to implement, and requires little memory in the process.

Asymmetric Encryption Techniques

The asymmetric encryption techniques (algorithms of public and private key) are algorithms using two different keys for encrypting and decrypting messages. One of the keys is published (public key) and the other is kept private (private key).

RSA is the first and most used algorithm of this kind, and is valid for encrypting as well as for digitally signing Patented by MIT in USA in 1983 with U.S. Pat. No. 4,405,829; patent expired in 2000.

Cryptographic Summary Techniques

The cryptographic summary techniques allow assigning to a digital content a digital fingerprint of encryption, in other words, a cryptographic summary with the aim of providing an identification only of the digital content, i.e. a hash allowing to create a theoretically unique digital fingerprint of a file. A clash between hashes would mean the possibility of existence of two documents with the same fingerprint. MD5 and SHA-512 are among the cryptographic summary techniques available.

Digital Signature

The digital signatures are used generally for the distribution of software, financial transactions and in other areas where it is important to detect forgery and manipulation. The digital signature is the result of applying a certain mathematical algorithm, called hash function, on its content and, subsequently, applying the signature algorithm (in which a private key is used) to the result of the previous operation, generating the digital signature.

The hash function is a mathematical algorithm that allows calculating a summary value of the data to be digitally signed. It works in a single direction, in other words, is not possible to calculate the original data starting from the summary value.

Usage of Each Cryptographic Technique in the Invention

The symmetric and asymmetric encryption techniques are used in the invention for encrypting/decrypting digital contents and encryption keys in a virtual recursive secure container. Besides, asymmetric encryption techniques are used in the invention for providing a reliable environment between the logical components of the Invention. All communication between the logical components is done in a secure and reliable way with the objective of ensuring all the rights of author of a digital content.

The cryptographic summary techniques provide a digital fingerprint to each digital content with an iterative secure container. This digital fingerprint is what differentiates it from the rest of digital contents with a virtual secure container of relationship of rights of author and consumer distributed by the Invention.

The digital fingerprint allows a digital content with a virtual secure container of relationship of rights of author and consumer to be distributed in the scenarios of secondhand, rental, exchange and temporary cession/gift, because the digital content has a unique identifier, and the encryption keys for generating the virtual recursive secure container will be able to transfer to the Avatars (Master and User); and only in this way will the Avatars that in that very moment own the relationship of rights encryption keys and be able to make use of the digital content, with a virtual secure container of relationship of rights of author and consumer.

Besides, digital signatures are used in the invention for validating and verifying that all executed logical components are reliable. All logical components must be reliable, not having undergone any modification by third parties, and in this way a virtual secure container of relationship of rights of author and consumer ensures that the protection the rights of author of a digital content is not violated in any of the logical components.

INDUSTRIAL APPLICABILITY

The invention provides to the electronic distribution of digital contents the same distribution scenarios of both past and present distribution of physical formats, and creates an environment where users of digital contents—electronically distributed through the invention—have the same options for sharing/selling/exchanging/giving away as if acquiring the digital content in a physical format; and authors of digital contents get full protection for their intellectual property rights.

It spreads knowledge and culture through the digital media and in a universal way, preserving the rights of author in every moment while allowing for temporary cession/gift, exchange and rental of digital contents, with virtual secure container of relationship of rights of author and consumer.

It generates a framework 'win2win' between authors and consumers in the context of the digital contents with a virtual secure container of relationship of rights of author and consumer, providing consumers with the same rights as when acquiring the aforementioned digital content through a physical medium, and at the same time protecting every right of the authors' intellectual property.

The media industry for authored digital contents gives the opportunity of spreading and strengthening the consumers' rights. When consumers buy a digital content such as music, films, electronic books, etcetera, they are allowed to have the same consumer rights as when they acquire them physically, giving consumers the possibility to create a 'special' album of digital contents and give it as a gift to other people, within the limits of consumer rights and preserving in every moment the Copyright.

It gives novel authors the opportunity of having a space for publishing their artistic expressions packaged in a digital content with a virtual secure container of relationship of rights of author and consumer, and enables them to obtain an income from their artistic creations.

It fosters the author's creativity, guaranteeing that his/her artistic activity will be protected against illegal copies, because the digital content is distributed with a virtual secure container of relationship of rights of author and consumer.

It brings consumers closer to buying authored digital contents with a virtual secure container of relationship of rights of author and consumer, because of preserving their rights of consumer for being able to sell, exchange or give away the content as a gift, should they not want to enjoy the authored digital content any more.

BRIEF DESCRIPTION OF DRAWINGS

For a better understanding of the invention, the following references are in the Drawings.

BEST MODES FOR CARRYING OUT THE INVENTION

Actors that Interact with the Invention

Figure 1:
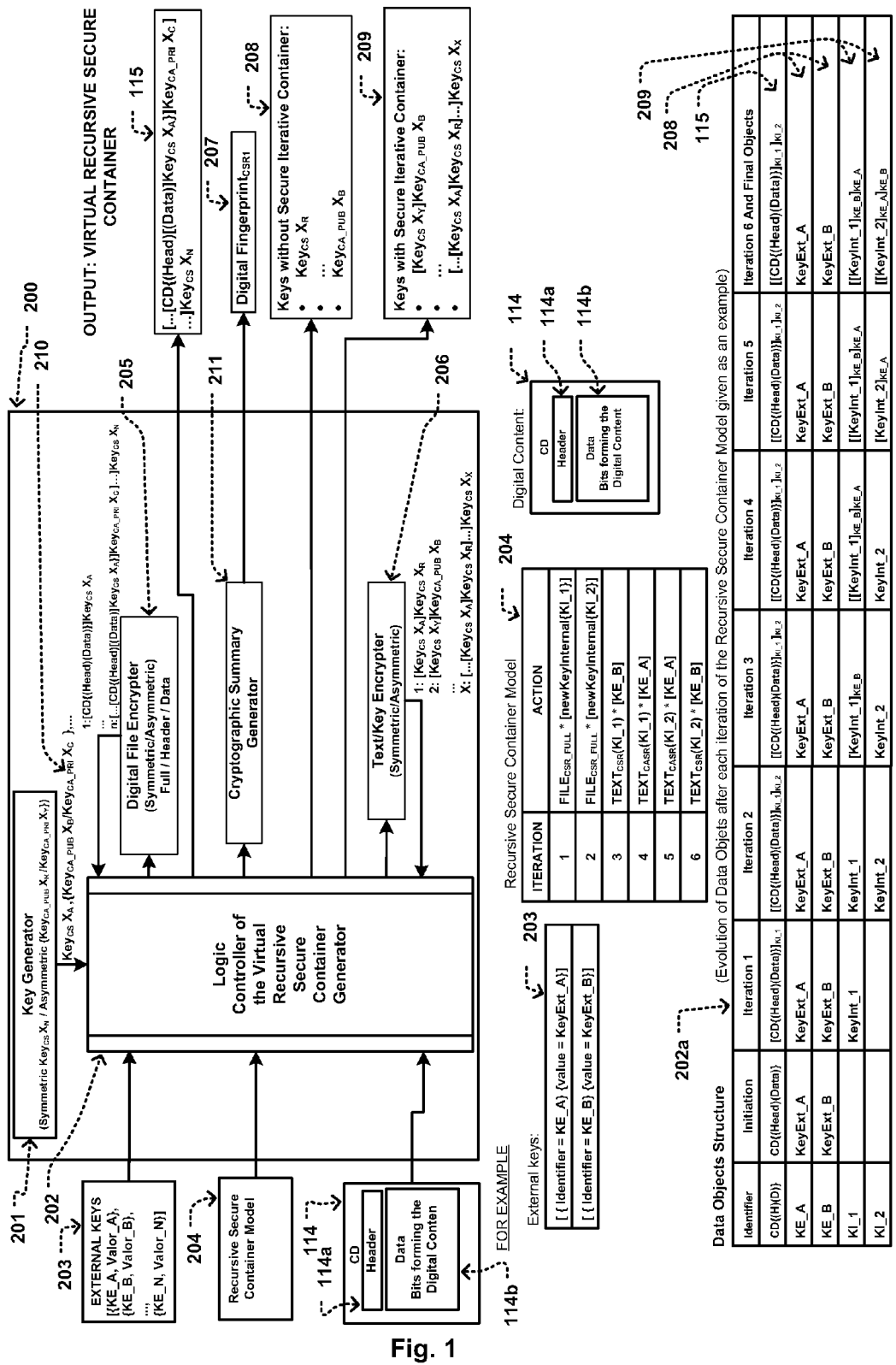
FIG. 1 describes the logical components of the method for generating the virtual recursive secure container according to the Invention.

An actor is something with behavior, such as a person (identified by a role), a computerized system or an organization that interacts with the Invention.

The main actors that interact with the System (100) are:

An Author (10) that creates a digital content (114) and publishes it in the System (100) for its protection and distribution. Generally, the Author (10) is the one who creates the digital content; nevertheless, the word 'author' is used here as the 'owner of the digital content'.

The distributor 20 is the publisher or any medium authorized to distribute the author's digital works.

The User (30) is the consumer of a digital content that has been published by an Author (10) or a distributor 20. The digital content that a user acquires through the invention is a Digital Content$_{CSR1}$ (115).

Internal Structure of the Digital File of a Digital Content

A digital content is stored in a digital file; header (114a) and data (114b) are in the internal structure of the digital file.

The header (114a) stores the metadata of the digital file. Metadata are fields of text embedded in almost every type of files and that supply additional information such as: creation date, resolution, size, modification date, author, etc. For example, in an operating system the following metadata are stored for each file: Date and time of creation, of modification, of last access, etc.

The data (114b) of the digital file are the set of bits that define the digital content and go after the header (114a).

Generation Method of the Virtual Recursive Secure Container

The method for generating a Virtual Recursive Secure Container (200) establishes virtual links of relationship to a digital file (114) through the generation of iterative secure containers for the digital file (114) as well as for the encryption keys (203, 210). The encryptions that can be undertaken for each iteration are through symmetric or asymmetric encryption techniques. When an encryption is done for an iteration, it can be applied to the result of previous encryptions.

The word 'secure container', as used here, refers to a digital content or encryption key that has been partially or totally encrypted, and the word 'recursive', as used here, means that iteration is used as a generic word, as a synonym for repetition, a particular case of iteration.

The method for generation a virtual recursive secure container in the invention has as input data: a digital file (114), the external keys (203) and the recursive secure container model (204).

And as the method's output:

A digital file (115) that will be able to receive a set of symmetric/asymmetric encryptions iteratively: Either in the header of the digital file and/or in the data of the digital file and/or in the whole digital data file. The execution order of the symmetric/asymmetric encryptions, either on part of the digital file or on the whole of it, is neither a constraint nor a limit.

A digital fingerprint$_{CSR1}$ (207), identifying in a unique way the digital file (115). The fingerprint results from applying a cryptographic summary technique to the digital file (115).

A list of keys without iterative secure container (208).

A list of keys with an iterative secure container (209).

External keys (203) are a set of encryption keys that can be used in a symmetric/asymmetric encryption in a particular iteration. The external keys (203) are represented by a list of data structures composed of two fields: The first field represents the identifier of the external key, and the second field has its value. For example, the external keys (203) are modeled with the following list of the data structure [{Id_KeyExt_A, Value_A}, {Id_KeyExt_B, Value_B} . . . {Id_KeyExt_N, Value_N}].

The recursive secure container model (204) defines the sequence of symmetric/asymmetric encryptions to be done. The encryption can be done in one of the following data objects: In the header (114a) of the digital file, in the data (114b) of the digital file, in the whole digital file (114) and in an encryption key (203, 210).

The recursive secure container model (204) indicates, for each iteration defined: The data object, the technique of symmetric/asymmetric encryption to be done in the data object and the encryption key to be used in the encryption (can be either external key (203) or randomly-generated (210)).

The recursive secure container model (204) is represented by a list of data structures composed of two elements, the first one defining the technique of the symmetric/asymmetric encryption and the encrypted data object:

To apply with symmetric encryption techniques an encryption on the header of the digital file, the token FILE$_{CSR\_HEAD}$ is used; if it is for the data of the digital file, the token FILE$_{CSR\_DATA}$ is used; and if it is for the whole digital file, token FILE$_{CSR\_FULL}$ is used.

To apply with asymmetric encryption techniques an encryption on the header of the digital file, the token FILE$_{CASR\_HEAD}$ is used; if it is for the data of the digital file, token FILE$_{CASR\_DATA}$ is used; and if it is for the whole digital file, token FILE$_{CASR\_FULL}$ is used.

To apply with symmetric encryption techniques an encryption on an encryption key, the token TEXT$_{CSR}$ is used.

To apply with asymmetric encryption techniques an encryption on an encryption key, the token TEXT$_{CASR}$ is used.

The second element indicates the encryption key to be used for generating the secure container in the iteration; such encryption key can be either external or randomly generated.

For an external encryption key, the identifier of the encryption key of the external key (203) is indicated, while for a random generated encryption key (210):

In case of a symmetric encryption key, the token newKeyInternal is used and a unique identifier is indicated for its identification {Identifier key}.

In case of an asymmetric encryption key, one of the tokens newKeyInternal$_{PUB}$ or newKeyInternal$_{PRI}$ is used. Besides, the unique identifiers for the public key and private key {public key identifier, private key identifier} are used. If the token newKeyInternal$_{PUB}$ is used, asymmetric encryption is done with the public key; if the token newKeyInternal$_{PRI}$ is used, asymmetric encryption is done with the private key.

The number of iterations to be done is determined by the recursive secure container model (204), which will be able to have between 2 and N iterations (N being an integer number), according to the degree of virtual links of relationship to be established.

As an example, a recursive secure container model (204) that creates the following virtual links of relationship:

Generates an iterative secure container of two iterations for the data of the digital file, the first iteration with asymmetric encryption with the external key KeyExt_A and the second iteration with symmetric encryption with a key generated internally with identifier KeyInternal_A2.

Generates an iterative secure container of two iterations for the external key KeyExt_A, the first iteration with asymmetric encryption with the external key KeyExt_B and the second iteration with a symmetric encryption with the key generated internally with identifier KeyInternal_A4.

Generates an iterative secure container of three iterations for the internal key KeyInternal_A2, the first iteration with symmetric encryption with the external key KeyExt_C, the second iteration with symmetric encryption with a key generated internally (KeyInternal_A6) and the third iteration with asymmetric encryption with the external key KeyExtB.

Therefore, following the previous example, the input data are:

Digital File (114).

External Keys (203), with a data structure [{KeyExt_A, Value_A}, {KeyExt_B, Value_B}, {KeyExt_C, Value_C}].

Recursive Secure Container Model (204), with a data structure:

[{Iteration 1: FILE$_{CASR\_DATA}$*[KeyExt_A]},
{Iteration 2: FILE$_{CSR\_DATA}$*[newKeyInternal{KeyInternal_A2}]},
{Iteration 3: TEXT$_{CASR}$(KeyExtA)*[KeyExt_B]},
{Iteration 4: TEXT$_{CSR}$(KeyExt_A)*[newKeyInternal{KeyInternal_A4}]},
{Iteration 5: TEXT$_{CSR}$(KeyInternal_A2)*[KeyExt_C]},
{Iteration 6: TEXT$_{CSR}$(KeyInternal_A2)*[newKeyInternal {KeyInternal_A6}]},
{Iteration 7: TEXT$_{CASR}$(KeyInternal_A2)*[KeyExt_B]}].

Figure 2:
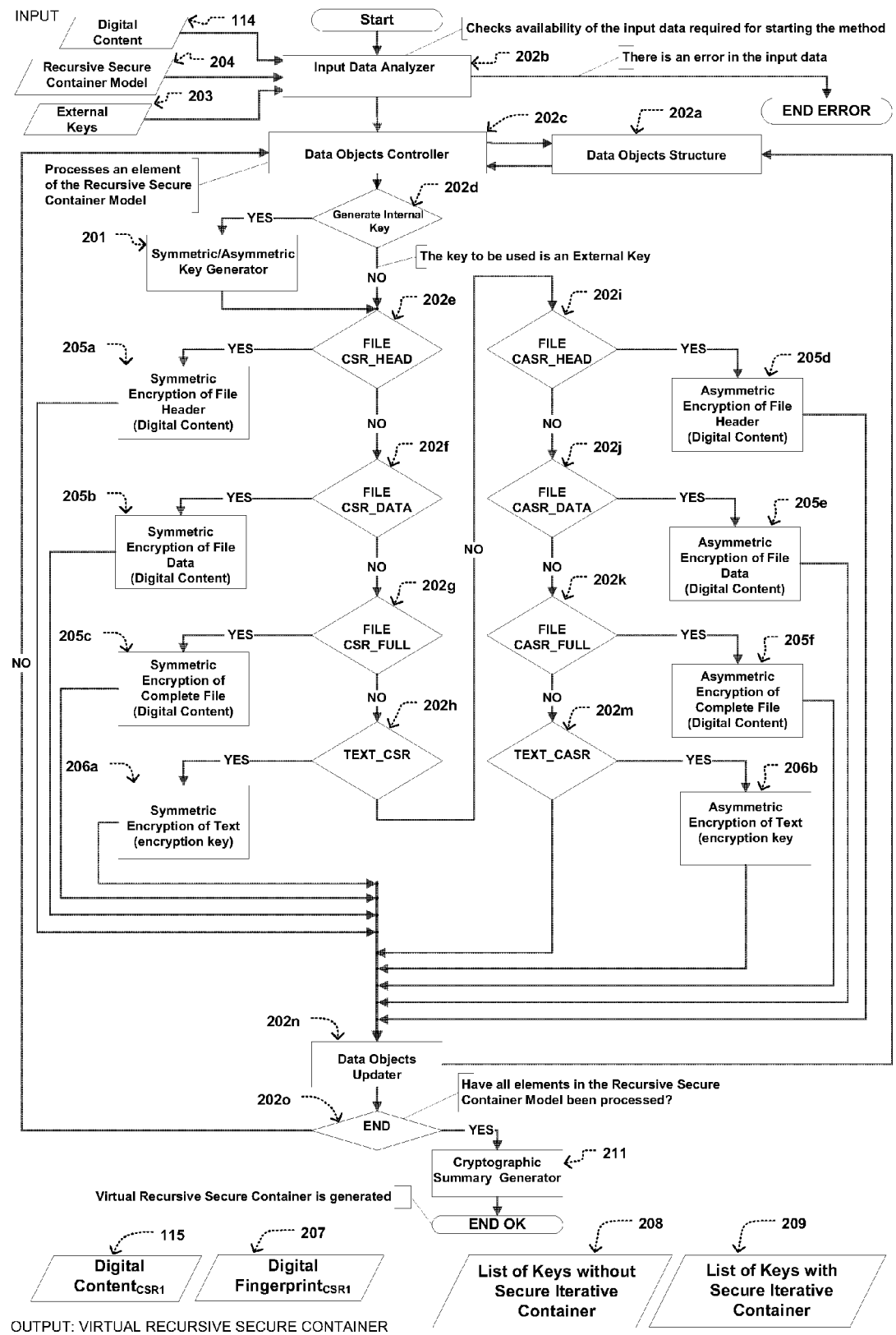
FIG. 2 describes the flow chart of the logic of the method for generating virtual recursive secure container according to the Invention.

FIG. 1 describes the logical components of the method for generating a virtual recursive secure container. The main logical component is the Logic Controller of the Virtual Recursive Secure Container Generator (202); this logical component executes the logic described in FIG. 2, starting from the input data, for creating virtual links of relationship according to the recursive secure container model indicated as input data.

The first phase of the method consists in the Input Data Analyzer (202b) that validates that input data are correct. The required input data are the digital content (114) and the recursive secure container model (204), while the external keys (203) are optional, and only needed in case the recursive secure container model (204) defines references to an encryption of external keys.

The Input Data Analyzer (202b) proceeds to the following validations and checks:

That the digital file (114) is correct and the format of the file is valid.

That the external keys (203) and the recursive secure container model (204) are correct at both syntactic and semantic levels.

The referential integrity of the keys indicated in the recursive secure container model (204). All the external keys indicated in the recursive secure container model must have their corresponding reference and a value in the input data external keys (203). Besides validates that all the iterative secure containers to be done on a randomly generated key indicated in the recursive secure container model (204) are generated in previous iterations.

In case there exists any error in the input data, or if the reference to an external key indicated in the recursive secure container model cannot be resolved, the method ends with an error indicating the cause of finalization.

The data object is a set of bits with its own entity that manages/processes/transforms the method for generating a virtual recursive secure container. The data objects are: the whole digital file (114), or part of the digital file (header (114a), data (114b)) and the encryption keys (both the external keys (203), and the randomly-generated keys (210)).

The following phase of the method is the logical component Data Objects Controller (202c) that has the following functionalities:

Creation of the starting Data Objects Structure (202a); it analyzes the recursive secure container model (204) and assigns a unique identifier to each data object.

It defines at a logical level the actions to be done in each iteration, starting from what is defined in the recursive secure container model (204).

It determines and prepares the data objects to be processed in the iteration in progress. In order to decide the necessary data objects, it analyzes the iteration in the recursive secure container model (204). In order to prepare the data object, looks for it in the Data Objects Structure (202a) of the previous iteration.

The Data Objects Structure (202a) is a dynamic data structure that keeps the evolution of transformation of each data object in each iteration. Symmetric/asymmetric encryptions are applied iteratively to the data objects, with the encryption key that indicates the iteration. Besides, this data structure is used for retrieving the transformation of the data object of the previous iteration, when a symmetric/asymmetric encryption in the data object is to be applied in the current iteration.

The following phase of the method is to determine the encryption key to be used in the current iteration for undertaking the symmetric/asymmetric encryption (202d):

If the key is generated randomly, the logical component Symmetric/Asymmetric Key Generator (201) is asked for an encryption key (210) (symmetric or asymmetric, according to the technique of encryption that is to be done).

If the encryption key is external, the value of the encryption key indicated in the external keys (203) is calculated from the identifier of the external encryption key indicated by the recursive secure container model (204).

The following phase of the method is to determine in which data object to apply the technique of encryption indicated in the iteration in progress, with the encryption key obtained in the previous phase:

In case of the token $FILE_{CSR\_HEAD}$ (202e), the logical component Symmetric Content Encryption (205a) is asked to apply with symmetric encryption techniques an encryption on the header (114a) of the digital file.

In case of the token $FILE_{CSR\_DATA}$ (202f), the logical component Symmetric Content Encryption (205b) is asked to apply with symmetric encryption techniques an encryption on the data (114b) of the digital file.

In case of the token $FILE_{CSR\_FULL}$ (202g), the logical component Symmetric Content Encryption (205c) is asked to apply with symmetric encryption techniques an encryption on the whole digital file (114).

In case of the token $TEXT_{CSR}$ (202h), the logical component Symmetric Encryption Text (206a) is asked to apply with symmetric encryption techniques an encryption on an encryption key.

In case of the token $FILE_{CASR\_HEAD}$ (202i), the logical component Asymmetric Content Encryption (205d) is asked to apply with asymmetric encryption techniques an encryption on the header (114a) of the digital file.

In case of the token $FILE_{CASR\_DATA}$ (202j), the logical component Asymmetric Content Encryption (205e) is asked to apply with asymmetric encryption techniques an encryption on the data (114b) of the digital file.

In case of the token $FILE_{CASR\_FULL}$ (202k), the logical component Asymmetric Content Encryption (205f) is asked to apply with asymmetric encryption techniques an encryption on the whole digital file (114).

In case of the token $TEXT_{CASR}$ (202m), the logical component Asymmetric Text Encryption (206b) is asked to apply with asymmetric encryption techniques an encryption on an encryption key.

Once the encryption with symmetric or asymmetric encryption techniques has been applied on a data object, Data Objects Updater (202n) is executed, and then the Data Objects Structure (202a) of the iteration in progress is updated with the transformation state of all data objects. In case it has been necessary to create a symmetric key, a new entry is added in the data structure object (202a), or two entries in case of an asymmetric key (public/private).

The following phase is to determine if (202o) has ended processing the recursive secure container model (204); if ended, the digital fingerprint is generated, with the Cryptographic Summary Generator (211). If on the contrary another iteration must be done, it goes back to the Data Object Controller (202c) and starts with the next iteration indicated in the recursive secure container model (204).

The Recursive Secure Container Model Preferred for the Invention

The Recursive Secure Container Model (204) preferred for the invention is defined as the most straightforward way for allowing all the distribution scenarios of the invention, and is the one used for describing its most representative use cases. Other models of recursive secure container could be used, adapting the use cases to them. The recursive secure container model preferred for the Invention is as follows:

Iteration 1: $FILE_{CSR\_DATA}$* [newKeyInternal{KeyInternal_A1}] (note: The key KeyInternal_A1, is used here, as $key_{INT}$ (210a)).

Iteration 2: $TEXT_{CSR}$(KeyInternal_A1)* [newKeyInternal{KeyInternal_A2}] (note: The key KeyInternal_A2, is used here, as $key_{AU}$ (208a)).

Iteration 3: $TEXT_{CSR}$(KeyInternal_A1)* [newKeyInternal{KeyInternal_A3}] (note: The key KeyInternal_A3, is used here, as key (208b)).

The recursive secure container model preferred generates an iterative secure container of an iteration on the data (114b) of the digital file with the symmetric encryption key $key_{INT}$ (210a), and in $key_{INT}$ (210a) generates an iterative secure container of two iterations with the keys $key_{AU}$ (208a) and $key_{AM}$ (208b).

According to the preferred recursive secure container model, the output after applying the method for generating virtual recursive secure container will be:

Digital Content$_{CSR1}$ (115), this term identifying here the digital file (114) with an iterative secure container of an encryption of data (114b) with the randomly generated symmetric encryption key $key_{INT}$ (210a).

Digital Fingerprint$_{CSR1}$ (207), this term identifying here the digital fingerprint of Digital Content$_{CSR1}$ (115).

key$_{CSR2}$ (209a), this term identifying here the key key$_{INT}$ (210a) with an iterative secure container of two iterations.

key$_{AU}$ (208a), this term identifying here the randomly-generated symmetric encryption key used for generating the iterative secure container in the first iteration of the key key$_{INT}$(210a), outputting as a result the key key$_{CSR1}$.

key$_{AM}$ (208b), this term identifying here the randomly-generated symmetric encryption key used for generating the iterative secure container in the second iteration of the key key$_{INT}$ (210a), outputting as a result the key key$_{CSR2}$ (209a).

Decryption Method of the Virtual Recursive Secure Container

The decryption method of the virtual recursive secure container consists in applying symmetric/asymmetric decryptions inversely to how symmetric/asymmetric encryptions were applied for sequentially generating the iterative secure containers; i.e., in processing the recursive secure container model (204) from end to start, undertaking a symmetrical or asymmetrical decryption as corresponds; in case of asymmetric encryptions, the private key will be used now if they were done with the public key, and the other way around.

As an example, for decrypting the data (114b) of Digital Content$_{CSR1}$ (115) and obtaining the data (114b) of the digital content (114) according to the preferred recursive secure container model (204), the following steps are taken:

First, symmetrically decrypt key$_{CSR2}$ (209a), with key (208b) (result is temporary data object key$_{CSR1}$).

Second, symmetrically decrypt key$_{CSR1}$ with key$_{AU}$(208a) (result is data object key$_{INT}$ (210a)).

Third, symmetrically decrypt the data (114b) of Digital Content$_{CSR1}$ (115) with key$_{INT}$ (210a).

Virtual Secure Container of Relationship of Rights: Of Author and of Consumer

The term 'virtual' is generally used for referring to something that exists only apparently, without being 'physically real'. In order to establish a relationship between rights of author and User, at least one virtual link of relationship must exist for the Digital Content$_{CSR1}$ (115).

The virtual links of relationship are created with the method for generating a virtual recursive secure container: Each new iterative encryption establishes a new virtual link of relationship. The virtual links of relationship can be established on any data object employing the method for generating a virtual recursive secure container.

The logical components of the invention Master Avatar (111) and User Avatar (112) create the virtual framework of relationship of rights of author and consumer, where the Master Avatar custodies that rights of author is not violated and User Avatar maintains the rights of consumer when buying a digital content. Master Avatar stores in a secure way the key key$_{AM}$ (208b), and User Avatar stores in a secure way the key key$_{AU}$ (208a). As each avatar has at least one of the Keys$_{CSR1}$ (208, 209) to be able to decrypt the data of Digital Content$_{CSR1}$ (115), the virtual link of relationship of rights of author and consumer is established.

The word 'avatar' is used here for indicating the virtual representation of an entity: The role of the entity is transferred to the avatar. When the relationship of rights is created between author and consumer, the role of author is transferred to the logical component of the invention Master Avatar (111), and the role of consumer is transferred to User Avatar (112).

The word 'Keys$_{CSR1}$' is used here for referring to the list of keys with an iterative secure container (209) and the list of keys without iterative secure container (208) that are obtained in the output of the method for generating a virtual recursive secure container.

The combination of the method for generating a virtual recursive secure container that establishes the virtual links of relationship to a digital file (114) with the encryption keys (203, 210), along with the distribution in a unique way of at least one of the Keys$_{CSR1}$ (208, 209) related to the Digital Fingerprint$_{CSR1}$ (207) of Digital Content$_{CSR1}$ (115) to each one of the Avatars, forms the Virtual Secure Container of Relationship of Rights.

Virtual Secure Container of Relationship of Rights: Of Authors, of Consumers and Other Entities A Virtual Secure Container of Relationship of Rights is not exclusively limited to an Author (10) and to a consumer 30; besides, it can be extended with more virtual links of relationship representing the rights of other entities, for example, a distributor, a regulatory office, and etcetera.

In order to establish new virtual links of relationship, the number of iterations of symmetric/asymmetric encryption on the method of virtual recursive secure container is incremented, and at least one of the Keys$_{CSR1}$ (208, 209) associated to the Digital Fingerprint$_{CSR1}$ (207) of Digital Content$_{CSR1}$ (115) is distributed in a unique way to a new avatar representing the new entity. Besides, the Master Avatar redefines the logic for consulting to the new avatars and obtaining the encryption key kept by each avatar of other entities.

Avatar with Several Roles

An avatar can implement internally several roles and represent several entities at the same time. When an avatar is assigned a set of roles, it will receive by each role implemented in a unique way at least one of the encryption keys of the virtual links of relationship of rights (Keys$_{CSR1}$ (208, 209)). The avatar with several roles listens through several communication ports, and each port is associated to a role.

Logical and Physical Architecture of the Invention

The objective of the logical architecture is to determine the top-level design of the Invention, and to define in an abstract way the main logical components that carry out some computation task, their interfaces, and the communication between them. It must be possible to implement all that architecture in a physical architecture that determines to which hardware/digital device assign each functionality.

Figure 3:
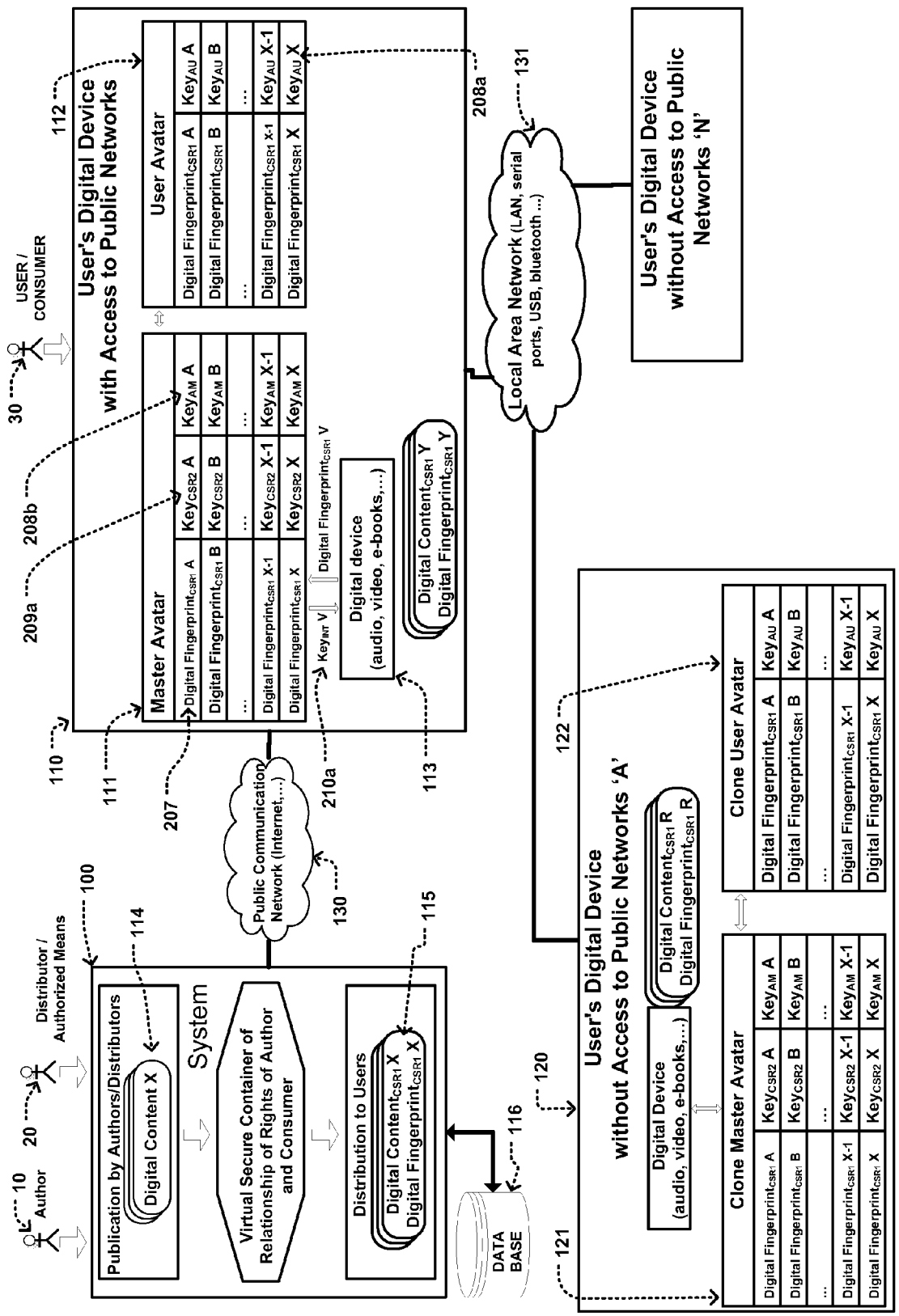
FIG. 3 describes the Logical/Physical Components of a System for protection and electronic distribution of authored digital contents in firsthand, secondhand, exchange, rental and temporary cession or gift, according to the Invention.

FIG. 3 shows the logical and physical architecture of the Invention. The logical components of the invention are the following:

System (100) logical component, that proceeds to the transformation of a digital content (114) into a Digital Content$_{CSR1}$ (115) with virtual secure container of relationship of rights of author and consumer, and allows the different scenarios of distribution and generates all the functional framework for management on the server side.

Master Avatar (111) is the logical component supervising that the rights of author is not violated. It stores in a secure way the association between the Digital Fingerprint$_{CSR1}$ (207) of a Digital Content$_{CSR1}$ (115), the key key$_{CSR2}$ (209a) that is the transformation of key$_{INT}$ (210a) with an iterative secure container of two iterations, and the key key$_{AM}$ (208b) used for generating the iterative secure container of key$_{INT}$ (210a) in the second iteration; and it is executed physically in a User's Digital Device with Access to Public Networks (110) and/or in the System (100).

User Avatar (112) is the logical component that keeps the rights of consumer when buying a digital content. It stores in a secure way the association between the Digital Fingerprint$_{CSR1}$ (207) of a Digital Content$_{CSR1}$ (115) and the key key$_{AU}$ (208a) used for generating the iterative secure container of key$_{INT}$ (210a) in the first iteration; and it is executed physically in a User's Digital Device with Access to Public Networks (110) and/or in the System (100).

Clone Master Avatar (121) is the logical component supervising that the rights of author is not violated. It stores in a secure way the association between the Digital Fingerprint$_{CSR1}$ (207) of a Digital Content$_{CSR1}$ (115) the encryption key key$_{CSR2}$ (209a) and the encryption key key$_{AM}$ (208b); and it is executed physically in a User's Digital Device without Access to Public Networks (120).

Clone User Avatar (122) is the logical component that keeps the rights of consumer when buying a digital content. It stores in a secure way the association between the Digital Fingerprint$_{CSR1}$ (207) of a Digital Content$_{CSR1}$ (115) and the encryption key key$_{AU}$ (208a); and it is executed physically in a User's Digital Device without Access to Public Networks (120).

Digital Player (113) is the logical component that reproduces/visualizes/executes the Digital Content$_{CSR1}$ (115); due to those tasks, it dialogues with the Master Avatar (111) in order to get the key key$_{INT}$ (210a) for decrypting the data (114b) of Digital Content$_{CSR1}$ (115); and it can be executed in a User's Digital Device either with Access to Public Networks (110) or without it (120).

FIG. 3 shows the physical components in which some logical components of the invention are executed:

A set of servers where the system is executed, and a set of databases (116).

A User's Digital Device with Access to Public Networks (110) is any electronic device that has the ability to connect to a public network (130), e.g. computers, laptops, mobile phones, tablets, etcetera; logical components of the Invention will be executed in that device.

A User's Digital Device without Access to Public Networks (120) is any electronic device that is not able to connect to a public network but can connect to a User's Digital Device with Access to Public Networks (110) for data transfer between them, e.g. a mp3 player; logical components of the Invention will be executed in that device.

Digital Devices

The digital device (110) and (120) is the hardware for allowing logical components of the invention that are not executed in the System (100), to reproduce/visualize/execute the Digital Content$_{CSR1}$ (115).

In the User's Digital Device with Access to Public Networks (110), the following logical components of the Invention will be executed: Master Avatar (111), User Avatar (112), Digital Player (113); and there will be a repository with the Digital Contents$_{CSR1}$ (115) that the user has acquired through the System (100). Besides, the User's Digital Device with Access to Public Networks (110) can have access to a local network of communications 131; the communication between the different devices can be done through any local channel, such as a local area network (LAN), serial communication ports, USB, Bluetooth and analogical. The communication channels can make use of wireless technologies, such as radio frequency or infrared technology. Through the aforementioned access it will be possible to communicate with a User's Digital Device without Access to Public Networks (120).

User's Digital Device without Access to Public Networks (120) is not able to connect to a public network, but it can establish a communication with a User's Digital Device with Access to Public Networks (110) for data transfer between them through a local network of communications 131. The following logical components of the Invention are executed there: Clone Master Avatar (121), Clone User Avatar 122, Digital Player (113); and there is the repository of Digital Contents$_{CSR1}$ (115) acquired by the user through the System (100).

Communication Between Logical Components of the Invention

Communication between logical components is always done under secure channels using asymmetric encryption techniques and symmetric encryption. The asymmetric encryption techniques have public key and private keys. The functioning of the asymmetric encryption is based on keeping secret the private keys and in the certification of the public keys.

The encryption algorithm RSA is reversible: Besides allowing to encrypt with the public key and to decrypt with the private one, it allows to encrypt with the private key and decrypt with the public key. In this way it can be used for getting privacy (encrypting with the public key of the receiver), as well as for signing (encrypting with the private key of the sender).

Public keys can be transmitted by insecure channels without that being a weakness:

Privacy in communications with the public key of the other logical component (Communication between A<=>B, A encrypts a confidential message for B, AsymmetricEncrypter(public_key_B, Message)).

Integrity and authentication of each logical component (private key) (Communication between A<=>B, AsymmetricEncrypter(private_key_A, Message): The message can be read because it has the public key of A; and as only A could do that encryption, the message is unmodified and authentic.

Privacy, integrity and authentication (Communication between A<=>B, AsymmetricEncrypter(private_key_A, AsymmetricEncrypter(public_key_B, Message)): The receiver will check the message's authenticity and later on will be able to decrypt it.

Once validated the identity of the logical component through its digital signature, communication with other logical component is established through a secure channel for data exchange.

Integrity of the Logical Components of the Invention

Besides always establishing secure communication channels between the Logical Components, there is a validation—through the digital signature of the logical component—of the logical component residing in those digital devices of a user (120) that have not undergone any manipulation.

Mathematical algorithms known as "cryptographic summary techniques" serve for calculating a summary value of the logical component to be digitally signed. They work in only one direction, i.e. it is not possible to calculate the original data starting from the summary value.

Sequence Diagrams of the Different Distribution Scenarios of the Invention

The sequence diagrams that are described next show the interaction through time of the logical components in the invention. The sequence diagram contains the actors, logical components of the invention, and the way in which logical components communicate between them (through the exchanged messages) as time goes by.

The sequence diagrams include the temporal dimension. The main issue is that interactions between logical components are done in the given sequence and that the sequence takes time in going from beginning to end.

Logical components/actors are represented by rectangles with their names; messages by continuous lines ending in arrowheads; and time by vertical progressions starting in the upper part and proceeding towards the lower, so that messages closer to the upper part will take place before those closer to the lower part.

A narrow rectangle can be found next to the line of life of a logical component; it is known as activation, and indicates that the object proceeds to an internal operation or action.

The sequence diagrams are simplified with the aim of representing the most representative messages, sometimes omitting messages of response to confirmations, and the primary objective is to reflect one of the possible implementations of each distribution scenario supplied by the invention for a protected digital content with a virtual secure container of relationship of rights of author and consumer.

'Firsthand' Distribution Scenario

The firsthand distribution is done when a user acquires a protected digital content with a virtual secure container of relationship of rights of author and consumer through of the invention, after publication by the author or an authorized medium.

Figure 4:
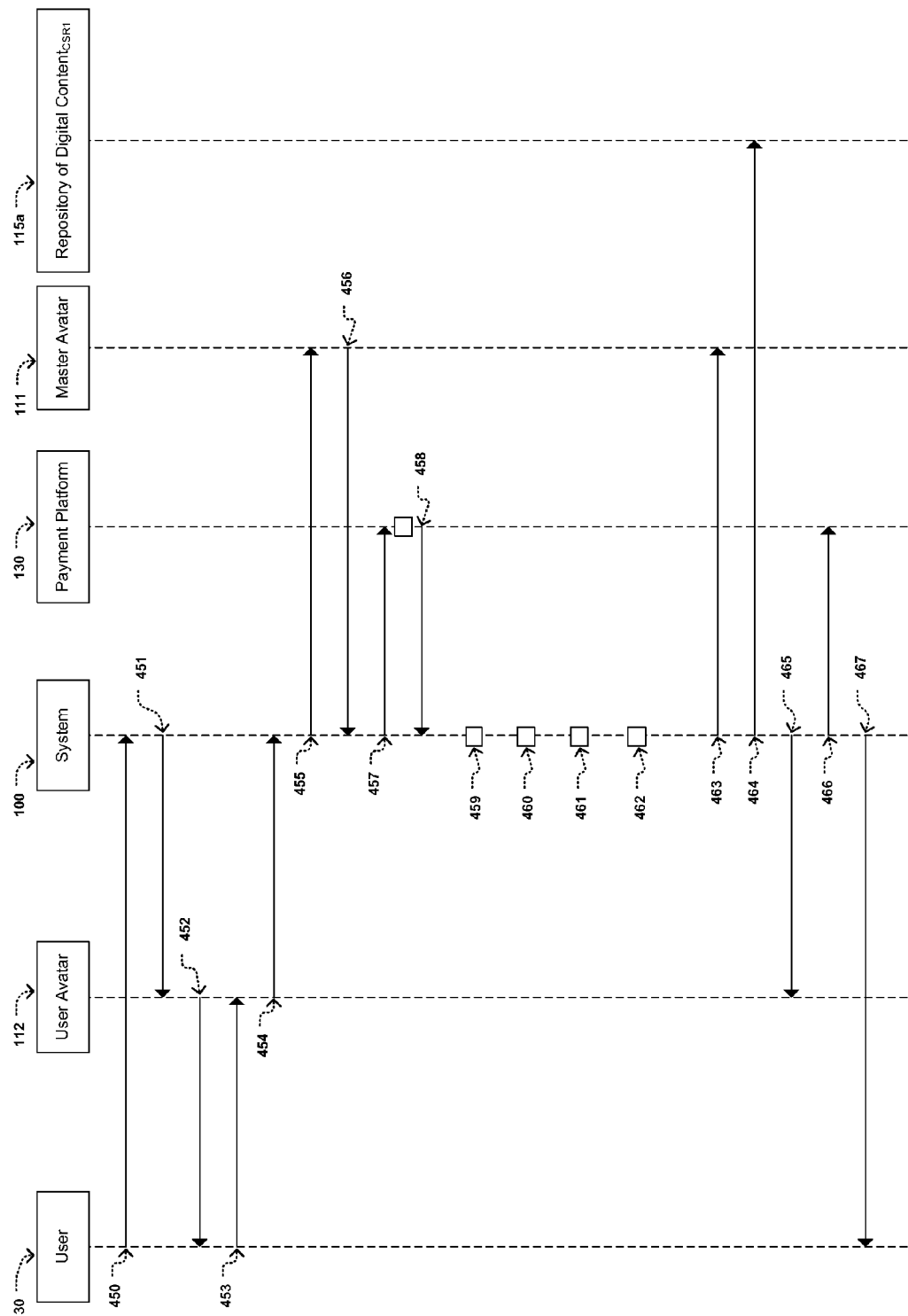
FIG. 4 is a sequence diagram of the messages and activations of the logical components according to the invention in the firsthand distribution.

FIG. 4 describes the sequence diagram of firsthand distribution scenario. It shows one of the possible sequences of messages and activations of the logical components of the invention, and tells how the kind of use cases dealt with in this section would be solved.

Messages and activations in FIG. 4 are as follows:
1. Message 450: a User (30), accesses the catalog of Digital $Content_{CSR1}$ (115) published by an Author (10) or authorized medium (20). It sends to the System (100) a demand for acquiring Digital $Content_{CSR1}$ (115) 'X'.
2. Message 451: System (100) validates User (30) through its User Avatar (112).
3. Message 452: User Avatar (112) sends a message to User (30) so that it authenticates, and informs of the acquisition start of Digital $Content_{CSR1}$ (115) 'X'.
4. Message 453: User Avatar (112) asks User (30) to authenticate, once the user has been authenticated.
5. Message 454: User Avatar (112) confirms to System (100) that User (30) has authenticated correctly, and User Avatar (112) authenticates through its digital signature with the System.
6. Message 455: System (100) validates the integrity of the Master Avatar (111).
7. Message 456: Master Avatar (111) authenticates with the System (100) through its digital signature.
8. Message 457: System (100) proceeds to the reservation of credit with the payment platform (130). Payment Platform manages the monetary account of the user, and in case there is not enough credit it holds a dialogue with the user, applying for more credit.
9. Message 458: Payment Platform (130) returns OK to the System (100), thus allowing distribution of Digital $Content_{CSR1}$ (115) 'X'.
10. Activation 459: System (100) generates the key $Key_{INT}$ (210a) 'X' and proceeds to the symmetric encryption on the data (114b) of the digital content (114) 'X' and is generated Digital $Content_{CSR1}$ (115) 'X'.
11. Activation 460: System (100) calculates the Digital $Fingerprint_{CSR1}$ (207) 'X' of Digital $Content_{CSR1}$ (115) 'X'.
12. Activation 461: System (100) generates the encryption key $Key_{AU}$ (208a) 'X' and proceeds to symmetric encryption of the key $Key_{INT}$ (210a) 'X' (first iteration) (the result is $Key_{CSR1}$).
13. Activation 462: System (100) generates the encryption key $Key_{AM}$ (208b) 'X' and proceeds to symmetric encryption of the key $Key_{INT}$ (210a) 'X' (second iteration) (the result is $Key_{CSR2}$ (209a)).
14. Message 463: System (100) sends to the Master Avatar (111) the triplet of data Digital $Fingerprint_{CSR1}$ (207) 'X'/ $Key_{CSR2}$ (209a) 'X'/Key (208b) 'X', so that it is stored in a secure way.
15. Message 464: System (100) sends to the repository (115a) of User (30) the Digital $Content_{CSR1}$ (115) 'X' with an iterative secure container of an iteration in the data (114b) with the encryption key $Key_{INT}$ (210a) 'X'.
16. Message 465: System (100) sends to User Avatar (112), the pair of data: Digital $Fingerprint_{CSR1}$ (207) 'X'/$Key_{AU}$ (208a) 'X' and stores it in a secure way.
17. With the distribution of the encryption keys $Key_{CSR2}$ (209a) 'X'/$Key_{AU}$ (208a) 'X'/$Key_{AM}$ (208b) 'X' to the avatars, the System (100) distributes the Digital Content (114) 'X' to User (30) transformed in Digital $Content_{CSR1}$ (115) 'X' and protected in a virtual secure container of relationship of rights of author and consumer.
18. Message 466: System (100) consolidates payment with the payment platform (130).
19. Message 467: System (100) confirms successful acquisition of Digital $Content_{CSR1}$ (115) 'X'.

'Secondhand'/'Rental' Distribution Scenario

The secondhand distribution is done when a user sells through the Invention a Digital $Content_{CSR1}$ (115) acquired to other user through of the invention. The rental distribution happens when an authorized medium fulfilling the legal framework to be able to do rentals of authored digital contents, rents a Digital $Content_{CSR1}$ (115) to a user.

Figure 5:
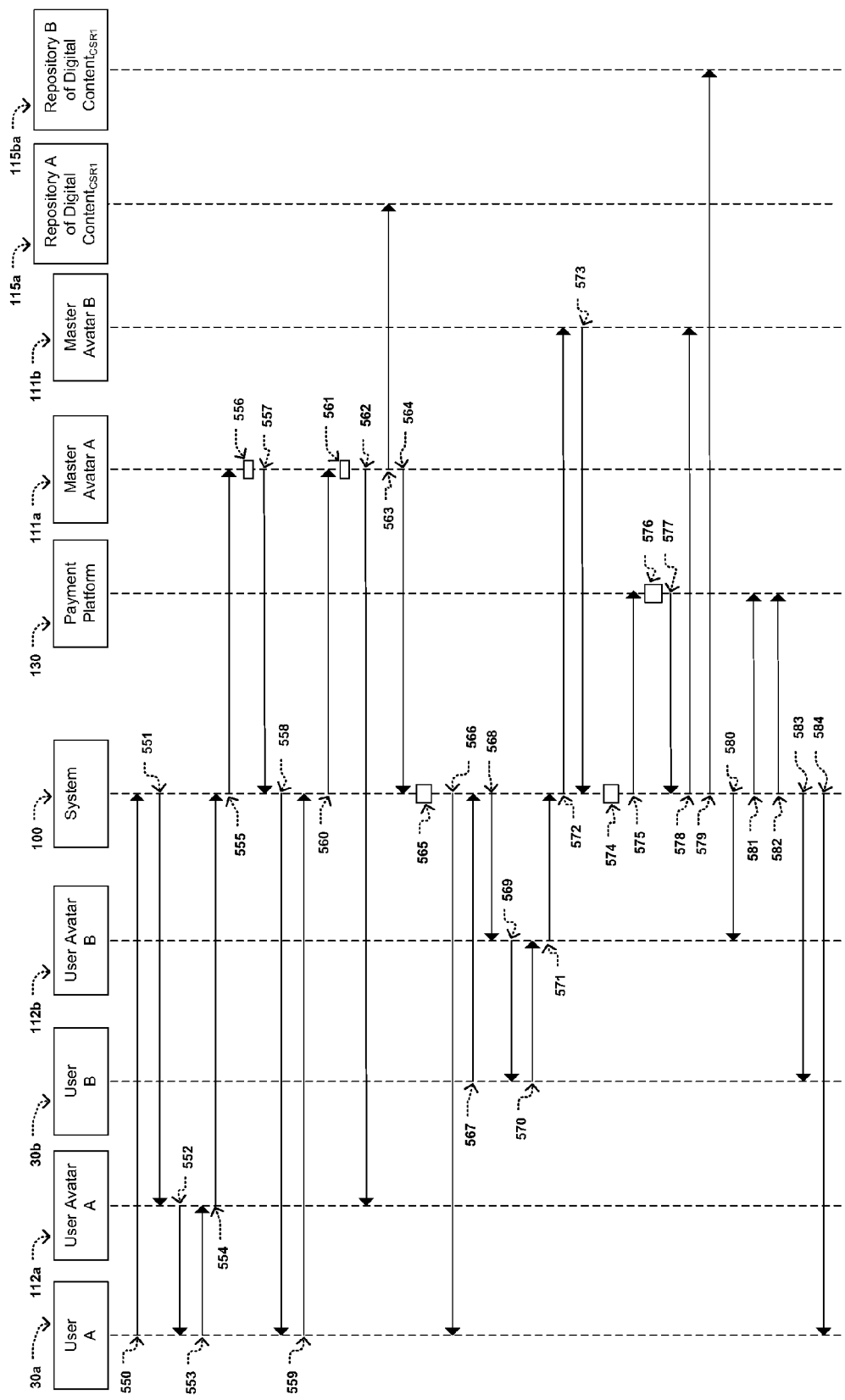
FIG. 5 is a sequence diagram of the messages and activations of the logical components according to the invention in the secondhand distribution and rental.

FIG. 5 describes the sequence diagram of the secondhand/ rental distribution scenario. The aim of this diagram is to show in detail one of the possible sequences of messages and activations of the logical components of the invention, and how the kind of use cases of distribution in the 'Secondhand'/ 'Rental' scenario would be solved.

The sequence diagram of rental is identical to that of secondhand, with the exception that the actor that starts the process is either an authorized medium for undertaking the rental of digital contents or a user that fulfills the legal framework to be able to do the rental, and what is published is the rental of a Digital $Content_{CSR1}$ (115).

To simplify the sequence diagram, it is supposed that the user has registered a unique Master Avatar and User Avatar. In case the user had registered more than one Master/User Avatars, messages with each Master/User Avatar would be repeated until all possible copies were deleted and the system had received the corresponding confirmation of each Master Avatar, therefore being able to start the process of Secondhand or of Rental.

There has also been a simplification of the message flow that would take place between the Master Avatar and the Clone Avatars in the various digital devices without access to a public network, reflecting it in the activation 561.

Messages and activations in FIG. 5 are as follows:
1. Message 550: User A (30a) acquired through the System (100) the Digital $Content_{CSR1}$ (115) 'X'[Digital $Fingerprint_{CSR1}$ (207) 'X'], and proceeds to ask for publishing the Digital $Content_{CSR1}$ (115) 'X'[Digital $Fingerprint_{CSR1}$ (207) 'X'] in the market of secondhand through the System (100).
2. Message 551: System (100) validates User A (30a), through its User Avatar A (112a).
3. Message 552: User Avatar A (112a) sends a message to User A (30a), so that it authenticates, and notifies the ensuing sale of secondhand the Digital $Content_{CSR1}$ (115) 'X'[Digital $Fingerprint_{CSR1}$ (207) 'X'].
4. Message 553: User Avatar A (112a) asks User A (30a) to authenticate, once the user has been authenticated.

5. Message 554: User Avatar A (112a) confirms to the System (100) that the user has authenticated correctly, and User Avatar A (112a) authenticates with the System (100) through its digital signature.
6. Message 555: System (100) validates the integrity of the Master Avatar A (111a) and asks for all the information about copies in Clone Master Avatar (121) done for the Digital Content$_{CSR1}$ (115) 'X'[Digital Fingerprint$_{CSR1}$ (207) 'X'] and that have not been deleted.
7. Activation 556: Master Avatar A (111a) gets the number of copies distributed in the different Clone Master Avatars (121) of User A (30a).
8. Message 557: Master Avatar A (111a) authenticates with System (100) with its digital signature, and informs of the number of copies done in Clone Master Avatar (121) and that have not been eliminated yet.
9. Message 558: System (100) notifies User A (30a) the Digital Content$_{CSR1}$ (115) 'X'[Digital Fingerprint$_{CSR1}$ (207) 'X'] is to be sold, informs of the number of copies that it has distributed in their corresponding Clone Master Avatar (121), and asks for confirmation of the deletion from User A (30a).
10. Message 559: User A (30a) accepts publication and proceeding to deletion of all those copies in their respective Clone Master Avatar (121).
11. Message 560: System (100) notifies Master Avatar A (111a) to proceed to deletion of all copies of Digital Content$_{CSR1}$ (115) 'X'[Digital Fingerprint$_{CSR1}$ (207) 'X'].
12. Activation 561: Master Avatar A (111a) starts the deletion operation by asking User A (30a) to connect to all devices without access to public networks and to proceed with the synchronization with the Clone Master Avatar (121) and Clone User Avatar (122) that are executing in the aforementioned device. Previously it validates all the logical components with their respective digital signatures. This process will be active until synchronization of all the digital devices in which the Master Avatar A (111a) has registered a synchronization of Digital Content$_{CSR1}$ (115) 'X' [Digital Fingerprint$_{CSR1}$ (207) 'X'].
13. Message 562: Master Avatar A (111a) has synchronized with all the Clone Master Avatar (121) and Clone User Avatar (122), and all references of Digital Content$_{CSR1}$ (115) 'X'[Digital Fingerprint$_{CSR1}$ (207) 'X'] have been deleted; then it proceeds to deletion of references in User Avatar A (112a) and of the reference he keeps himself.
14. Message 563: Master Avatar A (111a) deletes the Digital Content$_{CSR1}$ (115) 'X'[Digital Fingerprint$_{CSR1}$ (207) 'X'] of the repository of contents (115a) of User A (30a).
15. Message 564: Master Avatar A (111a) sends to the System (100) via callback a warning stating that all copies of Digital Content$_{CSR1}$ (115) 'X'[Digital Fingerprint$_{CSR1}$ (207) 'X'] have been deleted and that the aforementioned content can be published in the section of secondhand. Upon receiving this message, the System (100) ensures all rights of author, because of the deletion of all keys of the digital content to be sold in secondhand.
16. Activation 565: System (100) publishes in Secondhand, the Digital Content$_{CSR1}$ (115) 'X'[Digital Fingerprint$_{CSR1}$ (207) 'X'], and the identity of the user that publishes it remains registered, along with associated encryption keys Key$_{CSR2}$ (209a) 'X'/Key$_{AM}$ (208b) 'X'/Key$_{AU}$ (208a) 'X'.
17. Message 566: System (100) notifies User A (30a) the publication of Digital Content$_{CSR1}$ (115) 'X'[Digital Fingerprint$_{CSR1}$ (207) 'X'] in secondhand (this notification can be via mail, etc.).
18. Message 567: A User B (30b) that is accessing the catalog of published digital contents of secondhand, decides to buy Digital Content$_{CSR1}$ (115) 'X'[Digital Fingerprint$_{CSR1}$ (207) 'X']; it sends to the System (100) a demand for acquiring the Digital Content$_{CSR1}$ (115) 'X'[Digital Fingerprint$_{CSR1}$ (207) 'X'].
19. Message 568: System (100) validates User B (30b) through its User Avatar B (112b).
20. Message 569: User Avatar B (112b) sends a message to User B (30b) so that it authenticates, and notifies the ensuing acquisition of secondhand Digital Content$_{CSR1}$ (115) 'X'[Digital Fingerprint$_{CSR1}$ (207) 'X'].
21. Message 570: User Avatar B (112b) asks User B (30b) to authenticate, once the user has been authenticated.
22. Message 571: User Avatar B (112b) confirms to System (100) that User B (30b) has authenticated correctly, and User Avatar B (112b) authenticates with the System through its digital signature.
23. Message 572: System (100) validates the integrity of the Master Avatar B (111b).
24. Message 573: Master Avatar B (111b) authenticates with the System (100) through its digital signature.
25. Activation 574: System (100) triggers the beginning of the sale Secondhand of Digital Content$_{CSR1}$ (115) 'X'[Digital Fingerprint$_{CSR1}$ (207) 'X'] from User A (30a) to User B (30b).
26. Message 575: System (100) proceeds to reservation of credit with the payment platform (130). This platform manages the monetary account of User B (30b), and in case there is not enough credit it will hold a dialogue with User B (30b), applying for more credit.
27. Activation 576: Payment Platform (130) proceeds to the reservation of credit of User B (30b).
28. Message 577: Payment Platform (130) returns OK to the System (100) so that it proceeds to the distribution of Digital Content$_{CSR1}$ (115) 'X'[Digital Fingerprint$_{CSR1}$ (207) 'X'] with a virtual secure container of relationship of rights of author and consumer, and the encryption keys used for generating the relationship of rights are distributed.
29. Message 578: System (100) sends to the Master Avatar B (111b) the triplet of data Digital Fingerprint$_{CSR1}$ (207) 'X'/Key$_{CSR2}$ (209a) 'X'/Key$_{AM}$ (208b) 'X', so that it is stored in a secure way.
30. Message 579: System (100) sends to the repository of User B (30b) of contents (115) the Digital Content$_{CSR1}$ (115) 'X' with an iterative secure container of an iteration with key Key$_{INT}$ (210a) 'X'.
31. Message 580: System (100) sends to User Avatar B (112b), the pair of data Digital Fingerprint$_{CSR1}$ (207) 'X'/Key$_{AU}$ (208a) 'X', so that it is stored in a secure way.
32. The distribution of the encryption keys Key$_{CSR2}$ (209a) 'X'/Key$_{AU}$ (208a) 'X'/Key$_{AM}$ (208b) 'X' to the Avatars of User B (30b), Master Avatar B (111b) and User Avatar B (112b), the System (100) distributes the Digital Content (114) 'X' to User B (30b) transformed in Digital Content$_{CSR1}$ (115) 'X' and protected in a virtual secure container of relationship of rights of author and consumer.
33. Message 581: System (100) consolidates payment for User B (30b) with the platform (130).
34. Message 582: System (100) consolidates payment for User A (30a) with the platform (130).
35. Message 583: System (100) confirms successful acquisition of Digital Content$_{CSR1}$ (115) 'X'[Digital Fingerprint$_{CSR1}$ (207) 'X'] to User B (30b).
36. Message 584: System (100) confirms successful secondhand sale of Digital Content$_{CSR1}$ (115) 'X'[Digital Fingerprint$_{CSR1}$ (207) 'X'] to User A (30a).

'Exchange' Distribution Scenario

The exchange distribution happens when two users exchange Digital Content$_{CSR1}$ (115); in this scenario each user transfers and receives a Digital Content$_{CSR1}$ (115) to the other.

To simplify the sequence diagram, it is supposed that each user only has one Master Avatar and one User Avatar. In case the user had more than one Master/User Avatar, the messages with each Master/User Avatar would be repeated until all possible copies were deleted and the system got the corresponding confirmation of each Master Avatar and therefore would be able to start the process of Digital Contents$_{CSR1}$ (115) exchange.

There has also been a simplification of all the message flow that would take place between the Master Avatar to the Clone Avatars in the different digital devices without access to a public network, reflecting it in the Activations 668 and 680 (see below).

Figure 6:
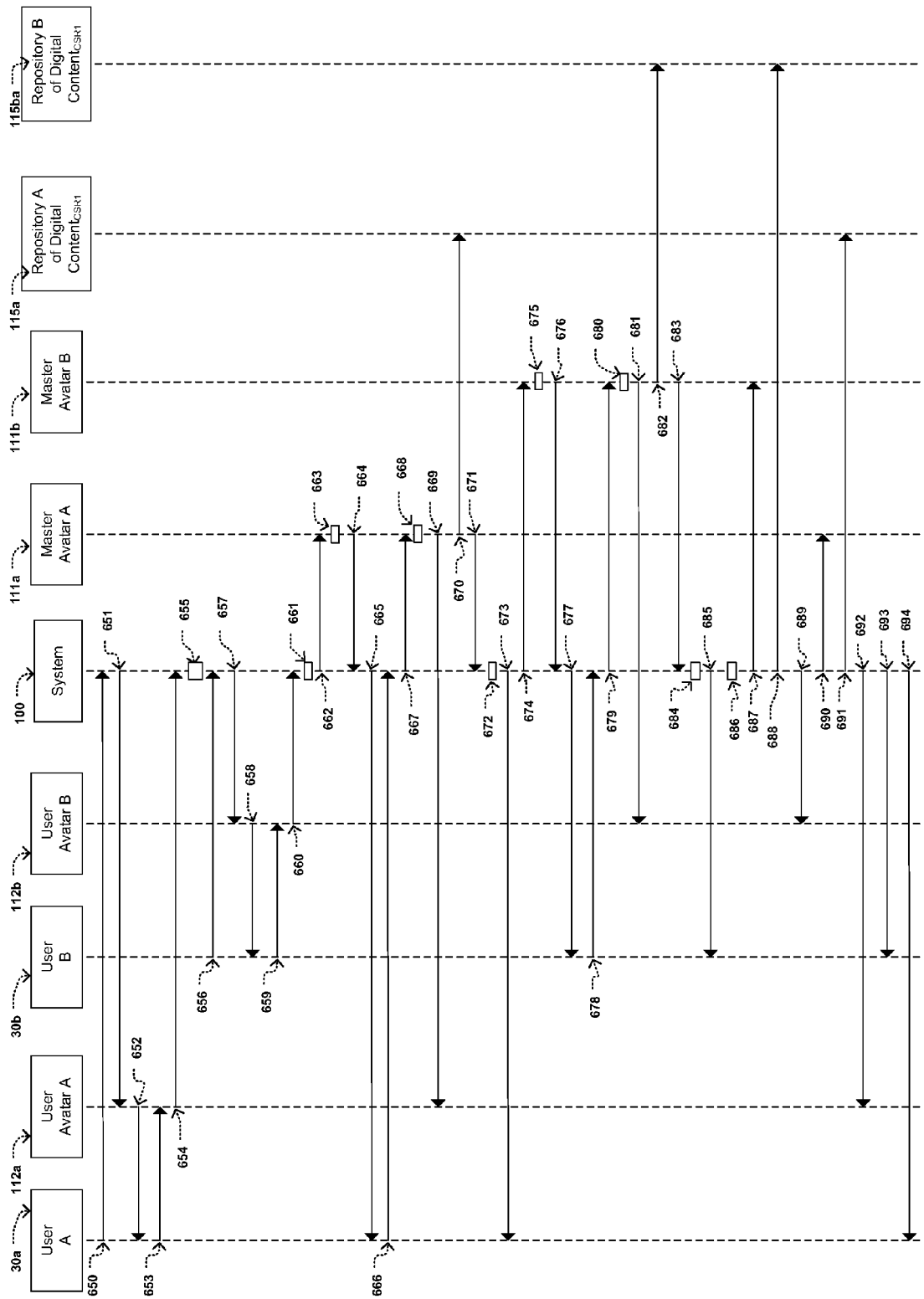
FIG. 6 is a sequence diagram of the messages and activations of the logical components according to the invention in the exchange distribution.

FIG. 6 describes the sequence diagram of distribution of exchange, with the aim of showing one of the possible sequences of messages and activations of the logical components of the invention, and how the kind of use cases dealt with in this section would be solved.

Messages and activations of FIG. 6 are as follows:

1. Message 650: User A (30a), acquired through System (100) the Digital Content$_{CSR1}$ (115) 'X'[Digital Fingerprint$_{CSR1}$ (207) 'X'], and proceeds to ask for publishing the Digital Content$_{CSR1}$ (115) 'X' [Digital Fingerprint$_{CSR1}$ (207) 'X'] for the exchange with the Digital Content$_{CSR1}$ (115) 'Y'[Digital Fingerprint$_{CSR1}$ (207) 'Y'] of User B (30b).
2. Message 651: System (100) validates User A (30a) through its User Avatar A (112a).
3. Message 652: User Avatar A (112a) sends a message to User A (30a), so that it authenticates, and informs about the ensuing the exchange of Digital Content$_{CSR1}$ (115) 'X' [Digital Fingerprint$_{CSR1}$ (207) 'X'] by the Digital Content$_{CSR1}$ (115) 'Y'[Digital Fingerprint$_{CSR1}$ (207) 'Y'] of User B (30b).
4. Message 653: User Avatar A (112a) asks User A (30a) to authenticate, and User A (30a) is validated.
5. Message 654: User Avatar A (112a) confirms to the System (100) that the user has authenticated correctly and User Avatar A (112a) authenticates with the System through its digital signature.
6. Activation 655: System (100) registers the demand of User A (30a) for exchanging Digital Content$_{CSR1}$ (115) 'X' [Digital Fingerprint$_{CSR1}$ (207) 'X'] for the Digital Content$_{CSR1}$ (115) 'Y'[Digital Fingerprint$_{CSR1}$ (207) 'Y'] of User B (30b).
7. Message 656: User B (30b) that acquired through the System (100) the Digital Content$_{CSR1}$ (115) 'Y'[Digital Fingerprint$_{CSR1}$ (207) 'Y'], proceeds to ask for publishing the Digital Content$_{CSR1}$ (115) 'Y'[Digital Fingerprint$_{CSR1}$ (207) 'Y'] for exchange with the Digital Content$_{CSR1}$ (115) 'X'[Digital Fingerprint$_{CSR1}$ (207) 'X'] of User A (30a).
8. Message 657: System (100) validates User B (30b), through its User Avatar B (112b).
9. Message 658: User Avatar B (112b) sends a message to User B (30b) so that it authenticates, and informs about the ensuing exchange of Digital Content$_{CSR1}$ (115) 'Y'[Digital Fingerprint$_{CSR1}$ (207) 'Y'] by the Digital Content$_{CSR1}$ (115) 'X'[Digital Fingerprint$_{CSR1}$ (207) 'X'] of User A (30a).
10. Message 659: User Avatar B (112b) asks User B (30b) to authenticate, and User B (30b) validates himself correctly.
11. Message 660: User Avatar B (112b) confirms to the System (100) that User B (30b) has authenticated correctly, and User Avatar B (112b) authenticates with the System through its digital signature.
12. Activation 661: System (100) already has confirmation of the exchange from User A (30a) and from User B (30b). It starts the preliminary phase for being able to do the exchange of User A (30a) of Digital Content$_{CSR1}$ (115) 'X'[Digital Fingerprint$_{CSR1}$ (207) 'X'] by the Digital Content$_{CSR1}$ (115) 'Y'[Digital Fingerprint$_{CSR1}$ (207) 'Y'] of User B (30b) and vice-versa.
13. Message 662: System (100) validates the integrity of the Master Avatar A (111a), asks for the copies done in Clone Master Avatar (121) for the Digital Content$_{CSR1}$ (115) 'X' [Digital Fingerprint$_{CSR1}$ (207) 'X'] and not yet deleted.
14. Activation 663: Master Avatar A (111a) gets the number of copies distributed in the different Clone Master Avatar (121) of User A (30a).
15. Message 664: Master Avatar A (111a) authenticates with the System (100) through its digital signature, and informs of the number of copies done in Clone Master Avatar (121) and that have not been eliminated yet.
16. Message 665: System (100) notifies User A (30a) about the ensuing exchange of Digital Content$_{CSR1}$ (115) 'X' [Digital Fingerprint$_{CSR1}$ (207) 'X'] for the Digital Content$_{CSR1}$ (115) 'Y'[Digital Fingerprint$_{CSR1}$ (207) 'Y'] of User B (30b), informs of the number of copies that exist of Digital Content$_{CSR1}$ (115) 'X'[Digital Fingerprint$_{CSR1}$ (207) 'X'] in their corresponding Clone Master Avatar (121), and asks for confirmation of the deletion from User A (30a).
17. Message 666: User A (30a), accepts the exchange and proceeds to the deletion of the copies in the Clone Master Avatar (121) of the User A 30a.
18. Message 667: System (100) notifies Master Avatar A (111a) to proceed with the deletion of all the copies of Digital Content$_{CSR1}$ (115) 'X'[Digital Fingerprint$_{CSR1}$ (207) 'X'].
19. Activation 668: Master Avatar A (111a) starts the deletion operation asking User A (30a) to connect to all devices without access to public networks and to proceed with the synchronization with the Clone Master Avatar (121) and Clone User Avatar (122) that are executing in the aforementioned device. It validates previously all the logical components with their respective digital signatures. This process will be active until synchronization of all digital devices in which the Master Avatar A (111a) has registered a synchronization of Digital Content$_{CSR1}$ (115) 'X'[Digital Fingerprint$_{CSR1}$ (207) 'X'].
20. Message 669: Master Avatar A (111a), synchronized with all the Clone Master Avatar and Clone User Avatar of User A (30a), and once deleted all the references of Digital Content$_{CSR1}$ (115) 'X'[Digital Fingerprint$_{CSR1}$ (207) 'X'], eliminates the reference in User Avatar A (112a) and its own reference.
21. Message 670: Master Avatar A (111a) erases the Digital Content$_{CSR1}$ (115) 'X'[Digital Fingerprint$_{CSR1}$ (207) 'X'] of the Contents Repository A (115a) of User A (30a).
22. Message 671: Master Avatar A (111a), sends to the System (100) via callback a warning of deletion of the copies of Digital Content$_{CSR1}$ (115) 'X'[Digital Fingerprint$_{CSR1}$ (207) 'X'], and User A (30a) is ready for undertaking the exchange.
23. Activation 672: System (100) registers that User A (30a) already fulfills the conditions for undertaking the exchange of Digital Content$_{CSR1}$ (115) 'X'[Digital Fingerprint$_{CSR1}$ (207) 'X'] by the Digital Content$_{CSR1}$ (115) 'Y'[Digital Fingerprint$_{CSR1}$ (207) 'Y'] of User B (30b).

24. Message 673: System (100) notifies User A (30a) that it fulfills the conditions of the exchange. It waits until User B (30b) also meets the conditions to be able to do the exchange.

25. Message 674: System (100) validates the integrity of the Master Avatar B (111b), and asks him for all the information about the copies done in Clone Master Avatar 121 for the Digital Content$_{CSR1}$ (115) 'Y'[Digital Fingerprint$_{CSR1}$ (207) 'Y'] and that have not been deleted yet.

26. Activation 675: Master Avatar B (111b) gets the number of copies distributed in the different Clone Master Avatar (121) of User B (30b).

27. Message 676: Master Avatar B (111b) authenticates with the System (100) through its digital signature, and informs of the number of copies done in Clone Master Avatar (121) and that have not been eliminated yet.

28. Message 677: System (100) notifies User B (30b) about the ensuing exchange of Digital Content$_{CSR1}$ (115) 'Y' [Digital Fingerprint$_{CSR1}$ (207) 'Y'] for the Digital Content$_{CSR1}$ (115) 'X'[Digital Fingerprint$_{CSR1}$ (207) 'X'] of User A (30a), informs of the number of copies it has of Digital Content$_{CSR1}$ (115) 'Y'[Digital Fingerprint$_{CSR1}$ (207) 'Y'] in their corresponding Clone Master Avatar (121), and asks for confirmation of the deletion from User B (30b).

29. Message 678: User B (30b) accepts the exchange and proceeding to the deletion of all the copies in their respective Clone Master Avatar (121) of User B (30b).

30. Message 679: System (100) notifies Master Avatar B (111b) to proceed to the deletion of all the copies of Digital Content$_{CSR1}$ (115) 'Y'[Digital Fingerprint$_{CSR1}$ (207) 'Y'].

31. Activation 680: Master Avatar B (111b) starts the deletion operation by asking User B (30b) to connect to all the devices without access to public networks and to proceed with the synchronization with the Clone Master Avatar (121) and Clone User Avatar (122) that are executing in the aforementioned device. It validates previously that all the logical components with their respective digital signatures. This process will be active until synchronization of all the digital devices in which the Master Avatar B (111b) has registered a synchronization of Digital Content$_{CSR1}$ (115) 'Y'[Digital Fingerprint$_{CSR1}$ (207) 'Y'].

32. Message 681: Master Avatar B (111b), synchronized with all the Clone Master Avatar and Clone User Avatar of User B (30b), once deleted all the references of Digital Content$_{CSR1}$ (115) 'Y'[Digital Fingerprint$_{CSR1}$ (207) 'Y'], eliminates the reference in User Avatar B (112b) and its own reference.

33. Message 682: Master Avatar B (111b) deletes the Digital Content$_{CSR1}$ (115) 'Y'[Digital Fingerprint$_{CSR1}$ (207) 'Y'] of the Contents Repository B (115b) of User B (30b).

34. Message 683: Master Avatar B (111b) sends to the System (100) via callback a warning stating the deletion of all the copies of Digital Content$_{CSR1}$ (115) 'Y'[Digital Fingerprint$_{CSR1}$ (207) 'Y'] and that User B (30b) is ready for undertaking the exchange.

35. Activation 684: System (100) registers that User B (30b) already meets all conditions for undertaking the exchange of Digital Content$_{CSR1}$ (115) 'Y'[Digital Fingerprint$_{CSR1}$ (207) 'Y'] by the Digital Content$_{CSR1}$ (115) 'X'[Digital Fingerprint$_{CSR1}$ (207) 'X'] of User A (30a).

36. Message 685: System (100) notifies User B (30b) that it already meets all conditions for undertaking the exchange, and that User A (30a) also meets the conditions to be able to do the exchange.

37. Activation 686: System (100) as well as User A (30a) and User B (30b), meet all conditions for undertaking the exchange of Digital Content$_{CSR1}$ (115) 'X'[Digital Fingerprint$_{CSR1}$ (207) 'X'] by the Digital Content$_{CSR1}$ (115) 'Y' [Digital Fingerprint$_{CSR1}$ (207) 'Y'] of User B (30b) and vice-versa. It starts the exchange process.

38. Message 687: System (100) sends to the Master Avatar B (111b), the triplet of data Digital Fingerprint$_{CSR1}$ (207) 'X'/Key$_{CSR2}$ (209a) 'X'/Key$_{AM}$ (208b) 'X', so that it is stored in a secure way.

39. Message 688: System (100) sends to the Contents Repository B (115b) the Digital Content$_{CSR1}$ (115) 'X' with an iterative secure container of an iteration with key Key$_{INT}$ (210a) 'X'.

40. Message 689: System (100) sends to User Avatar B (112b), the information Digital Fingerprint$_{CSR1}$ (207) 'X'/Key$_{AU}$ (208a) 'X' and keeps it in a secure way.

41. The distribution of the encryption keys Key$_{CSR2}$ (209a) 'X'/Key$_{AU}$ (208a) 'X'/Key$_{AM}$ (208b) 'X' to the Avatars of User B (30b), Master Avatar B (111b) and User Avatar B (112b), the System (100) distributes the Digital Content (114) 'X' to User B (30b) transformed in Digital Content$_{CSR1}$ (115) 'X' and protected in a virtual secure container of relationship of rights of author and consumer.

42. Message 690: System (100) sends to the Master Avatar A (111a), the triplet of data Digital Fingerprint$_{CSR1}$ (207) 'Y'/Key$_{CSR2}$ (209a) 'Y'/Key$_{AM}$ (208b) 'Y', so that it is stored in a secure way.

43. Message 691: System (100) sends to the contents Repository A (115a) the Digital Content$_{CSR1}$ (115) 'Y' with an iterative secure container of an iteration with key Key$_{INT}$ (210a) 'Y'.

44. Message 692: System (100) sends to User Avatar A (112a), the information Digital Fingerprint$_{CSR1}$ (207) 'Y'/Key$_{AU}$ (208a) 'Y' and stores it in a secure way.

45. The distribution of the encryption keys Key$_{CSR2}$ (209a) 'Y'/Key$_{AU}$ (208a) 'Y'/Key$_{AM}$ (208b) 'Y' to the Avatars of User A (30a), Master Avatar A (111a) and User Avatar A (112a), the System (100) distributes the Digital Content (114) 'Y' to User A (30a) transformed in Digital Content$_{CSR1}$ (115) 'Y' and protected in a virtual secure container of relationship of rights of author and consumer.

46. Message 693: System (100) confirms to User B (30b) the exchange of Digital Content$_{CSR1}$ (115) 'Y'[Digital Fingerprint$_{CSR1}$ (207) 'Y'] by the Digital Content$_{CSR1}$ (115) 'X' [Digital Fingerprint$_{CSR1}$ (207) 'X'] of User A (30a).

47. Message 694: System (100) confirms to User A (30a) the exchange of Digital Content$_{CSR1}$ (115) 'X'[Digital Fingerprint$_{CSR1}$ (207) 'X'] by the Digital Content$_{CSR1}$ (115) 'Y' [Digital Fingerprint$_{CSR1}$ (207) 'Y'] of User B (30b).

'Temporary Transfer/Gift' Distribution Scenario and Returns of 'Temporary Transfer' or of 'Rental'

The Transfer Distribution is done when a user proceeds to a temporary cession of the digital content to other user and no monetary transaction exists between the user that transfers the Digital Content$_{CSR1}$ (115) and the user that receives temporarily the usage of Digital Content$_{CSR1}$ (115).

During the period of temporary cession, the user that transfers temporarily the digital content will not be able to make use of the digital content transferred, while the user that receives the temporary cession will enjoy usage of Digital Content$_{CSR1}$ (115). A Gift of a Digital Content$_{CSR1}$ (115) is understood as a cession in which the cession time is unlimited.

The returns of either temporary cession or rental, although being different kinds of cases, are identical as regards the sequence diagram, and for that reason are described as one.

To simplify the sequence diagram, it is supposed that the user has registered a unique Master Avatar and User Avatar. In case the user had more than one Master/User Avatar, the messages with each Master/User Avatar would be repeated until deletion of all the possible copies and the system getting the corresponding confirmation of each Master Avatar and therefore be able to start the process of cession or return.

The message flow that would take place between Master Avatar and Clone Avatars in the different digital devices without access to a public network has also been simplified, reflecting it in the Activation 761 (see below).

Figure 7:
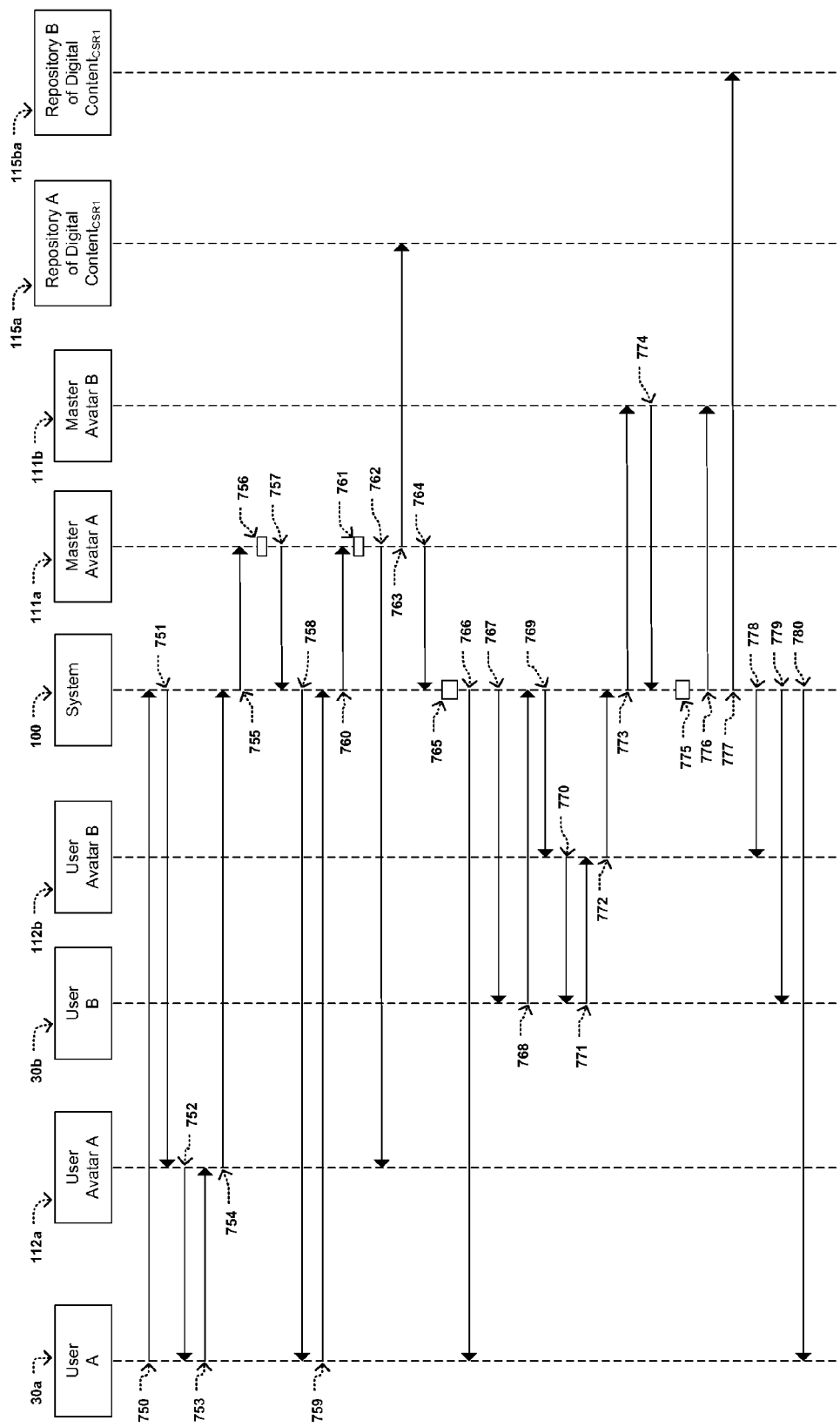
FIG. 7 is a sequence diagram of the messages and activations of the logical components according to the invention in the scenarios of temporary cession/gift, return of temporary cession and return of rental.

FIG. 7 describes the sequence diagram of distribution of temporary cession or gift and the return of a temporary cession or of a rental. The aim of this diagram is to show in detail one of the possible sequences of messages and activations of the logical components of the invention, and to show how the kind of cases that are dealt with in this section would be solved.

Messages and activations of FIG. 7 are as follows:

1. Message 750: User A (30a) acquired through the System (100) the Digital Content$_{CSR1}$ (115) 'X'[Digital Fingerprint$_{CSR1}$ (207) 'X'], and proceeds to ask User B (30b) for a return/cession of the Digital Content$_{CSR1}$ (115) 'X'[Digital Fingerprint$_{CSR1}$ (207) 'X'].
2. Message 751: System (100) validates User A (30a), through its User Avatar A (112a).
3. Message 752: User Avatar A (112a) sends a message to User A (30a) so that it authenticates, and informs about the ensuing return/cession of Digital Content$_{CSR1}$ (115) 'X' [Digital Fingerprint$_{CSR1}$ (207) 'X'].
4. Message 753: User Avatar A (112a) asks User A (30a) to authenticate, once the user has been authenticated.
5. Message 754: User Avatar A (112a) confirms to the System (100) that User A (30a) has authenticated correctly, and User Avatar A (112a) authenticates with the System (100) through its digital signature.
6. Message 755: System (100) validates the integrity of the Master Avatar A (111a), and asks for information about the copies in Clone Master Avatar (121) of Digital Content$_{CSR1}$ (115) 'X'[Digital Fingerprint$_{CSR1}$ (207) 'X'] and not yet eliminated.
7. Activation 756: Master Avatar A (111a) gets the number of copies distributed in the different Clone Master Avatars (121) of User A (30a).
8. Message 757: Master Avatar A (111a) authenticates with the System (100) through its digital signature. It informs of the number of copies done in Clone Master Avatar (121) of User A (30a) and not yet deleted.
9. Message 758: System (100) notifies User A (30a) about the ensuing return/cession of Digital Content$_{CSR1}$ (115) 'X' [Digital Fingerprint$_{CSR1}$ (207) 'X'], informs of the number of copies that it has distributed in their corresponding Clone Master Avatar (121), and asks User A (30a) for deletion confirmation.
10. Message 759: User A (30a) accepts the return/cession and proceeding to the deletion of all the copies in their respective Clone Master Avatar (121).
11. Message 760: System (100) notifies Master Avatar A (111a) to proceed to the deletion of all the copies of Digital Content$_{CSR1}$ (115) 'X'[Digital Fingerprint$_{CSR1}$ (207) 'X'].
12. Activation 761: Master Avatar A (111a) starts deletion asking User A (30a) to connect to all devices without access to public networks and to proceed with the synchronization with the Clone Master Avatar (121) and Clone User Avatar (122) that are in the aforementioned device. It validates previously all the logical components with their respective digital signatures. This process will be active until synchronization of all digital devices in which the Master Avatar A (111a) registered a synchronization of Digital Content$_{CSR1}$ (115) 'X'[Digital Fingerprint$_{CSR1}$ (207) 'X'].
13. Message 762: Master Avatar A (111a), synchronized with all the Clone Master Avatar (121) and Clone User Avatar (122), and once deleted all the references of Digital Content$_{CSR1}$ (115) 'X'[Digital Fingerprint$_{CSR1}$ (207) 'X'], removes the reference in User Avatar A (112a) and its own reference.
14. Message 763: Master Avatar A (111a) deletes Digital Content$_{CSR1}$ (115) 'X'[Digital Fingerprint$_{CSR1}$ (207) 'X'] from the Contents Repository (115a) of User A (30a).
15. Message 764: Master Avatar A (111a) sends to System (100) via callback a notification of the deletion of all copies of Digital Content$_{CSR1}$ (115) 'X'[Digital Fingerprint$_{CSR1}$ (207) 'X'] and confirmation that the return/cession can be done. Upon receiving this message, the System (100) ensures all rights of author, because of the deletion of all the encryption keys of Digital Content$_{CSR1}$ (115) 'X' that are to be returned or involved in a temporary cession/gift.
16. Activation 765: System (100) is ready for return/cession of Digital Content$_{CSR1}$ (115) 'X'[Digital Fingerprint$_{CSR1}$ (207) 'X'], and registers who is the user that returns/transfers it, along with associated encryption keys Key$_{CSR2}$ (209a) 'X'/Key$_{AM}$ (208b) 'X'/Key$_{AU}$ (208a) 'X'.
17. Message 766: System (100) notifies User A (30a) of having ended the return/cession of Digital Content$_{CSR1}$ (115) 'X'[Digital Fingerprint$_{CSR1}$ (207) 'X'] (notification can be via mail, etc.) and of expecting User B (30b) to receive the return/cession.
18. Message 767: System (100) notifies User B (30b) about the availability of a return/cession of Digital Content$_{CSR1}$ (115) 'X'[Digital Fingerprint$_{CSR1}$ (207) 'X'] (notification can be via mail, etc.).
19. Message 768: A User B (30b), when receiving the notification stating the availability of a return/cession of Digital Content$_{CSR1}$ (115) 'X'[Digital Fingerprint$_{CSR1}$ (207) 'X'], sends a retrieval notification of the return/cession of Digital Content$_{CSR1}$ (115) 'X'[Digital Fingerprint$_{CSR1}$ (207) 'X'].
20. Message 769: System (100) validates User B (30b) through its User Avatar B (112b).
21. Message 770: User Avatar B (112b) sends a message to User B (30b) so that it authenticates, and notifies the ensuing return/cession of Digital Content$_{CSR1}$ (115) 'X'[Digital Fingerprint$_{CSR1}$ (207) 'X'].
22. Message 771: User Avatar B (112b) asks User B (30b) to authenticate, once the user has been authenticated.
23. Message 772: User Avatar B (112b) confirms to System (100) that User B (30b) has authenticated correctly, and User Avatar B (112b) authenticates with the System through its digital signature.
24. Message 773: System (100) validates the integrity of the Master Avatar B (111b).
25. Message 774: Master Avatar B (111b) authenticates with the System (100) through its digital signature.
26. Activation 775: System (100) triggers the beginning of the return/cession of Digital Content$_{CSR1}$ (115) 'X'[Digital Fingerprint$_{CSR1}$ (207) 'X'] from User A (30a) to User B (30b).
27. Message 776: System (100) sends to the Master Avatar B (111b) the triplet of data Digital Fingerprint$_{CSR1}$ (207) 'X'/Key$_{CSR2}$ (209a) 'X'/Key$_{AM}$ (208b) 'X', so that it is stored in a secure way.

28. Message 777: System (100) sends to the Contents Repository B (115b) the Digital Content$_{CSR1}$ (115) 'X' with an iterative secure container of an iteration with key Key$_{INT}$ (210a) 'X'.
29. Message 778: System (100) sends to User Avatar B (112b) the pair of data: Digital Fingerprint$_{CSR1}$ (207) 'X'/Key$_{AU}$ (208a) 'X' and stores it in a safe way. The distribution of the keys Key$_{CSR2}$ (209a) 'X'/Key$_{AU}$ (208a) 'X'/Key$_{AM}$ (208b) 'X' to the Avatars of User B (30b), Master Avatar B (111b) and User Avatar B (112b), the System (100) distributes the Digital Content (114) 'X' to User B (30b) transformed in Digital Content$_{CSR1}$ (115) 'X' and protected in a virtual secure container of relationship of rights of author and consumer.
30. Message 779: System (100) confirms successful return/cession of Digital Content$_{CSR1}$ (115) 'X'[Digital Fingerprint$_{CSR1}$ (207) 'X'] to User B (30b).
31. Message 780: System (100) confirms successful return/cession of Digital Content$_{CSR1}$ (115) 'X'[Digital Fingerprint$_{CSR1}$ (207) 'X'] to User A (30a).

Figure 8:
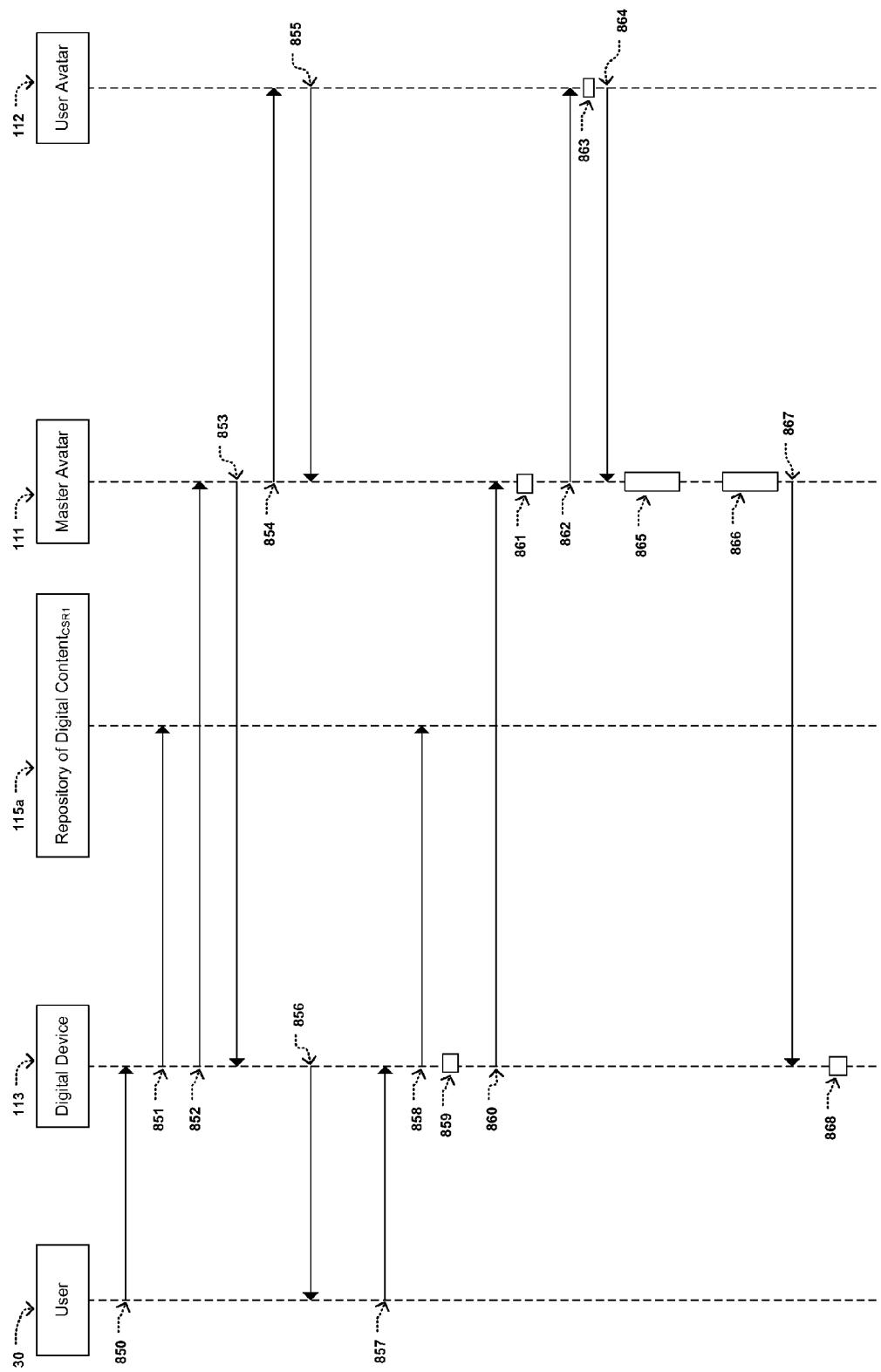
FIG. 8 is a sequence diagram of the messages and activations of the logical components according to the invention, describing the actions taking place when making use of a digital content with a virtual secure container of relationship of rights of author and consumer.

Usage and Enjoyment for a User of a Digital Content with a Virtual Secure Container of Relationship of Rights of the Author and Consumer FIG. 8 describes the sequence diagram of the usage and enjoyment of a protected digital content in a virtual secure container of relationship of rights of the author and consumer. The aim of this diagram is to show one of the possible sequences of messages and activations of the logical components of the invention, and how the kind of cases dealt with in this section would be solved.

Messages and activations of FIG. 8 are described now:
1. Message 850: a User (30) accesses its Digital Player (113).
2. Message 851: Digital Player (113) retrieves from the Digital Contents Repository$_{CSR1}$ (115a) all the meta-information of the header of the files, for showing that information to User (30).
3. Message 852: Digital Player (113) authenticates, generates a secure channel and indicates its digital signature to Master Avatar (111).
4. Message 853: Master Avatar (111) also authenticates and indicates its digital signature to Digital Player (113).
5. Message 854: Master Avatar (111) authenticates, generates a secure channel and indicates its digital signature to User Avatar (112).
6. Message 855: User Avatar (112) also authenticates and indicates its digital signature to the Master Avatar (111).
7. Message 856: Digital Player (113) shows the list of Digital Contents$_{CSR1}$ (115) 'X' to User (30).
8. Message 857: The User (30) selects a Digital Content$_{CSR1}$ (115) 'Y'.
9. Message 858: Digital Player (113) retrieves the Digital Content$_{CSR1}$ (115) 'Y' from the repository.
10. Activation 859: Digital Player (113) calculates the Digital Fingerprint$_{CSR1}$ (207) 'Y' of Digital Content$_{CSR1}$ (207) 'Y'.
11. Message 860: Digital Player (113) queries to Master Avatar (112) with the Digital Fingerprint$_{CSR1}$ (207) 'Y' asking it to supply Key$_{INT}$ (210a) 'Y' for enabling decryption of the data (114b) of Digital Content$_{CSR1}$ (115) 'Y' and therefore reproduction of the Digital Content$_{CSR1}$ (115) 'Y'.
12. Activation 861: Master Avatar (111) queries if it has got the Digital Fingerprint$_{CSR1}$ (207) 'Y', and if an entry does exist then queries to User Avatar (112).
13. Message 862: Query to User Avatar (112) for getting the information related to Digital Fingerprint$_{CSR1}$ (207) 'Y'.
14. Activation 863: User Avatar (112) queries if it has an entry for the Digital Fingerprint$_{CSR1}$ (207) 'Y'.
15. Message 864: User Avatar (112) sends to Master Avatar (111) the keys Key$_{AU}$ (208a) 'Y' that it has associated for the Digital Fingerprint$_{CSR1}$ (207) 'Y'.
16. Activation 865: Master Avatar (111) proceeds to symmetrical decryption of Key$_{CSR2}$ (209a) 'Y' with the key Key$_{AM}$ (208b) 'Y', and the result is Key$_{CSR1}$ 'Y'.
17. Activation 866: Master Avatar (111) proceeds to the symmetrical decryption of Key$_{CSR1}$ 'Y' with the key Key$_{AU}$ (208a) 'Y', and the result is Key$_{INT}$ (210a) 'Y'.
18. Message 867: Master Avatar (111) sends to Digital Player (113) the key Key$_{INT}$ (210a) 'Y' of Digital Fingerprint$_{CSR1}$ (207) 'Y'.
19. Activation 868: Digital Player (113) with the key Key$_{INT}$ (210a) 'Y' decrypts the data (114b) of Digital Content$_{CSR1}$ (115) 'Y'[Digital Fingerprint$_{CSR1}$ (207) 'Y'] and reproduces Digital Content$_{CSR1}$ (115) 'Y' so that User (30) can make use of it.

Copies of a Digital Content with a Virtual Secure Container of Relationship of Rights of the Author and Consumer in Various Digital Devices of a Same User A user can copy the digital contents with virtual secure container of relationship of rights of the author and consumer in his various digital devices, either with Access to Public Networks (110) or without it (120). All those digital devices must have installed the Clone Master Avatar (121) and Clone User Avatar (122) of User (30). In case of some other user's device, no copy will be done.

To be able to reproduce/visualize/execute the digital contents with virtual secure container of relationship of rights of the author and consumer, there must be synchronization of the corresponding avatars of both the Master Avatar (111) and the User Avatar (112) with the corresponding avatar of the device in which the copy is done: Clone Master Avatar (121) and Clone User Avatar (122) respectively.

Figure 9:
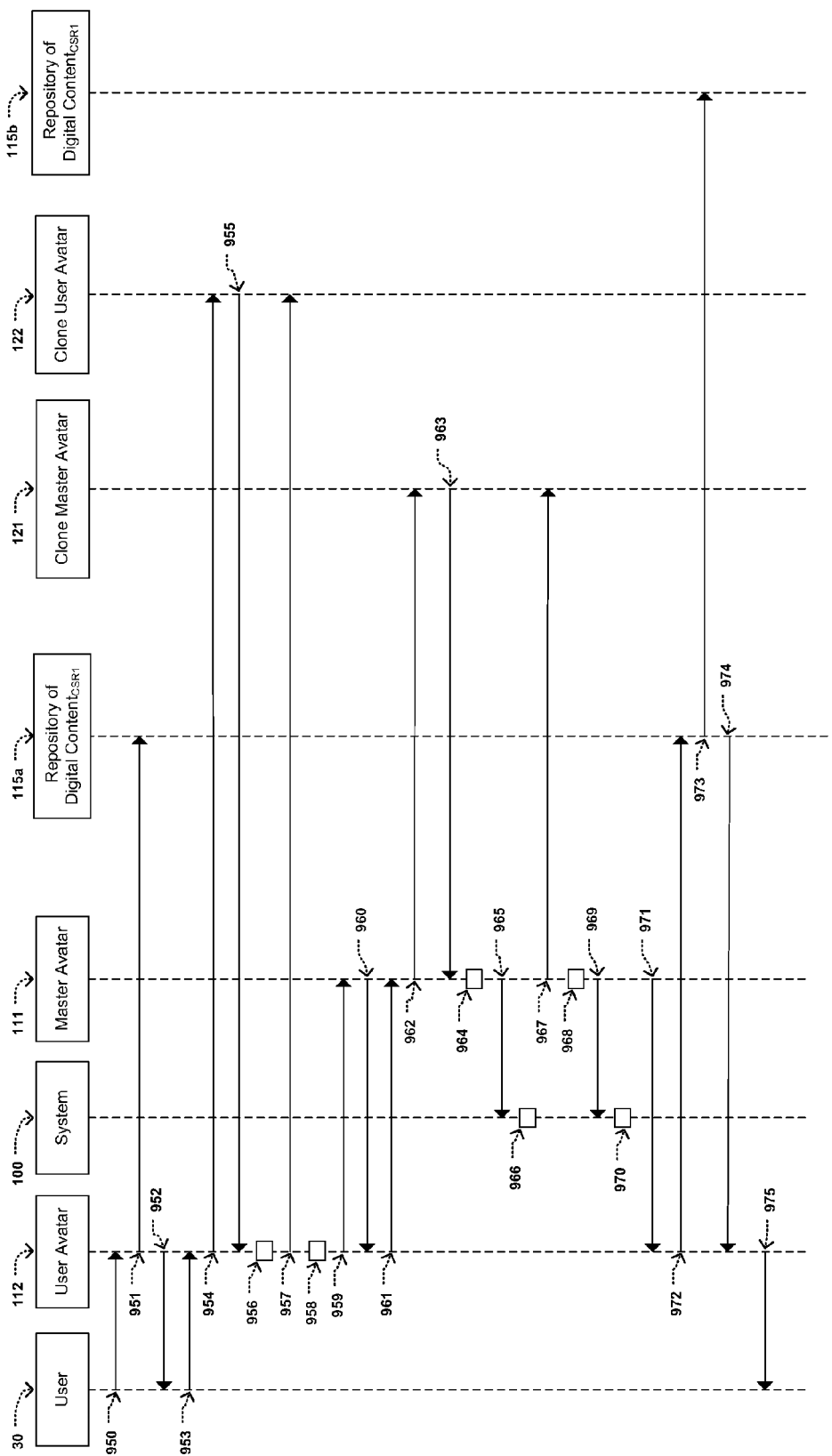
FIG. 9 is a sequence diagram of the messages and activations of the logical components according to the invention, describing the actions taking place for synchronization of the Avatars with their respective Clone Avatars in the digital devices with/without access to a public network of the user.

FIG. 9 describes the sequence diagram of how the Avatars synchronize when the user does the copy of the digital contents—with virtual secure container of relationship of rights of the author and consumer- to other digital device of the same user. The aim of this diagram is to show in detail one of the possible sequences of messages and activations of the logical components of the invention, and how the kind of cases dealt with in this section would be solved.

Messages and activations in FIG. 9 are described now:
1. Message 950: By a User (30) that is accessing its User Avatar (112) for a synchronization of digital contents with a virtual secure container of relationship of rights of the author and consumer to other digital device, after that user authenticates in its User Avatar (112).
2. Message 951: User Avatar (112) retrieves from the repository of all Digital Contents$_{CSR1}$ (115) the meta-information of the header of the files, to show it to the User (30).
3. Message 953: The User (30) selects a list of Digital Contents$_{CSR1}$ (115) for cloning it in other device of User (30) itself.
4. Message 954: User Avatar (112) authenticates, generates a secure channel, indicates its digital signature, and asks for all the information about Digital Fingerprints$_{CSR1}$ (207) available at Clone User Avatar (122).
5. Message 955: Clone User Avatar (122) authenticates, indicates its digital signature to User Avatar (112) and gives it all the information of Digital Fingerprints$_{CSR1}$ (207) of Digital Contents$_{CSR1}$ (115).

6. Activation 956: User Avatar (112) validates the information and registers all the Digital Fingerprints$_{CSR1}$ (207) that are going to synchronize with Clone User Avatar (122) of the digital device.
7. Message 957: User Avatar (112) transfers to Clone User Avatar (122) all the Digital Fingerprints$_{CSR1}$ (207) along with the associated keys.
8. Activation 958: User Avatar (112) does a commit stating that the synchronization with Clone User Avatar (122) has been correct.
9. Message 959: User Avatar (112) authenticates, generates a secure channel, indicates its digital signature, and asks for all the information about Digital Fingerprints$_{CSR1}$ (207) available at Master Avatar (111).
10. Message 960: Master Avatar (111) authenticates, indicates its digital signature to User Avatar (112) and gives it all the information of Digital Fingerprints$_{CSR1}$ (207) of Digital Contents$_{CSR1}$ (115).
11. Message 961: User Avatar (112) indicates to the Master Avatar (111) that it synchronizes with the Clone Master Avatar (121).
12. Message 962: Master Avatar (111) authenticates, generates a secure channel, indicates its digital signature, and asks for all the information about Digital Fingerprints$_{CSR1}$ (207) available at Clone Master Avatar (121).
13. Message 963: Clone Master Avatar (121) authenticates and indicates its digital signature to the Master Avatar (111) and gives to it all the information of Digital Fingerprints$_{CSR1}$ (207) of Digital Contents$_{CSR1}$ (115).
14. Activation 964: Master Avatar (111) validates the information and registers all the Digital Fingerprints$_{CSR1}$ (207) that are going to synchronize with the Clone Master Avatar (121) of the digital device.
15. Message 965: Master Avatar (111) transfers to the System (100) all the control information of the synchronization realized with the digital device.
16. Activation 966: System (100) registers in the user account the control information of the synchronization with the digital device.
17. Message 967: Master Avatar (111) transfers to the Clone Master Avatar (121) all the Digital Fingerprints$_{CSR1}$ (207) along with the associated encryption keys.
18. Activation 968: Master Avatar (111) does a commit stating that synchronization with the Clone Master Avatar (121) has been correct.
19. Message 969: Master Avatar (111) indicates to the System (100) that synchronization with the digital device was correct.
20. Activation 970: System (100) registers in the user account the commit of the synchronization with the digital device.
21. Message 971: Master Avatar (111) indicates to User Avatar (112) that synchronization with the digital device was correct.
22. Message 972: User Avatar (112) indicates to the Digital Contents Repository$_{CSR1}$ (115a) that it synchronizes with the Digital Contents Repository$_{CSR1}$ (115b) of the digital device.
23. Message 973: The Digital Contents Repository$_{CSR1}$ (115a) synchronizes with the Digital Contents Repository$_{CSR1}$ (115b) of the digital device.
24. Message 974: The Digital Contents Repository$_{CSR1}$ (115a) tells User Avatar (112) that the synchronization with the Digital Contents Repository$_{CSR1}$ (115b) of the digital device was correct.
25. Message 975: User Avatar (112) tells User (30) that the synchronization was correct.

Avatar

The Avatars of the invention have a role, which is to represent an actor that is part of the virtual secure container of relationship of rights. In its role of representation of an actor it keeps at least one of the keys that allow to decrypt the Digital Content$_{CSR1}$ (115) with a virtual recursive secure container.

To build a virtual secure container of relationship of rights between the Author (10) and the consumer (30), an avatar is needed for each actor that is part of relationship of rights: Master Avatar (111) and User Avatar (112), along with their respective clones that are executed in each one of the devices of the User (30).

The Avatars are logical components of the invention that are a special kind of non-interactive computer process, in other words, executed in the background instead of being controlled directly by the user. This kind of programs are executed in a continuous, endless way and even when trying to close or kill those process, they will go on running, or will restart automatically, and all this without any third parties and without dependence from any terminal.

This kind of functioning is known as 'daemon process' in the operating systems UnixLinux, or as 'services' of the Windows operating system. The Avatars will be completely secure processes and their main functionality is the management of the Keys$_{CSR1}$ (208, 209) distributed by the System (100) along with the management functionalities for synchronization with other avatars with the same role although in different digital devices of the same user.

The Avatars will have a set of communication ports, where they will receive messages from any other logical component of the invention, or from the System (100). All communication will be in a secure way and before starting it the Avatars will authenticate through the digital signature of each logical component; if the authentication is not correct, the communication will not be established.

With the Avatars it is possible to create in any moment a virtual secure container of relationship of rights of the author and consumer. If the virtual secure container of relationship of rights needs more entities with a precise role, it is only necessary to activate a new avatar representing the new role in each one of the users' digital devices, and adapt the logic of the Master Avatar so that it asks the new avatar and in this way obtains the encryption key kept by the avatar in representation of the new entity.

In a User's Digital Device with Access to Public Networks (110), these avatars are executed:

Master Avatar (111), whose role in the invention is to check that there is no Copyright infringement. It stores in a secure way the association between the Digital Fingerprint$_{CSR1}$ (207) of a Digital Content$_{CSR1}$ (115) with the keys key$_{CSR2}$ (209a) and key$_{AM}$ (208b). Besides, it keeps the following management functionalities:

Synchronization with other avatars of the same role (Clone Master Avatar (121)) but in other digital device of the same User (30), this new digital device of user must belong to the same owner, if it is of other owner/user will not synchronize. The way for detecting it is done through the digital signatures of the avatars, because before being able to synchronize, to the cloned avatar must have been registered by the user in its account.

Register of all the synchronization done with other avatars of the same role but in other digital device of user and which Digital Fingerprints$_{CSR1}$ (207) of Digital Content$_{CSR1}$ (115) have been distributed to each one.

Sending of all the synchronization information to the user account of the System (100) that the User (30) in every moment will be able to consult.

Register of the only User Avatar (112) with which it is able to dialogue and exchange information within the same digital device and that has been validated and registered by the System (100).

Register of the digital signatures of the software that does the reproduction-visualization-execution of a Digital Content$_{CSR1}$ (115) and validation that is a secure software.

User Avatar (112), the role that has in the invention is to preserve the rights of consumers buying Digital Contents$_{CSR1}$ (115). It stores in a secure way the association between the Digital Fingerprint$_{CSR1}$ (207) of a Digital Content$_{CSR1}$ (115) with the key key$_{AU}$ (208a). Besides it keeps the following management functionalities:

Synchronization with other avatars of the same role (Clone User Avatar (122)) but in other digital device of the User (30), this new digital device must belong to the same owner, if it is of other owner/user will not synchronize. The way for detecting it will be through the digital signatures of the avatars, because before being able to synchronize, the Avatars must have been registered by the user in its account.

Register of all the synchronization done with other avatars of the same role but in other digital device of the user, and register of Digital Fingerprints$_{CSR1}$ (207) of Digital Content$_{CSR1}$ (115) that have been distributed.

Sending of all the synchronization information to the user account of the System (100) that the User (30) in every moment will be able to consult.

Register of the unique Master Avatar (111) with which it is able to dialogue and exchange information within the same device, and that has been validated and registered by the System (100).

In a User's Digital Device without Access to Public Networks (120) the avatars will be executed:

Clone Master Avatar (121), the role that has in the invention is to check that the rights of author is not violated. It stores in a secure way the association between the Digital Fingerprint$_{CSR1}$ (207) of a Digital Content$_{CSR1}$ (115) with the keys key$_{CSR2}$ (209a) and key$_{AM}$ (208b). This Avatar does not have any management functionality, and can only synchronize with the Master Avatar (111) of the User (30).

Clone User Avatar (122) the role that has in the invention is to preserve the rights of consumers buying digital contents. It stores in a secure way the association between the Digital Fingerprint$_{CSR1}$ (207) of a Digital Content$_{CSR1}$ (115) with the key key$_{AU}$ (208a). This avatar does not have any management functionality, and can only synchronize with User Avatar (112) of the User (30).

Delegated Avatar in the System

In a user's Digital Device with Access to Public Networks (110), will be able to delegate the execution of the Master Avatar (111) and User Avatar (112) in the System (100); therefore, Digital Player (113) to the Master Avatar (111) of the user that is in the System (100), instead of consulting to the Master Avatar (111) that should be found locally in a user's Digital Device with Access to Public Networks (110).

The System Server

The software of the Avatars communicates and interacts with the software of the server. Besides, the users (30) can communicate and interact with the software of the server through a web browser.

The logical component System (100) controls and keeps a set of databases (116) that are used for providing the following functionalities:

On the side of the user:

Functional framework for the distribution of Digital Contents$_{CSR1}$ (115) in the scenarios of firsthand, secondhand, rental, exchange and temporary cession/gift.

Functional framework allowing the User (30) to retrieve all the Digital Contents$_{CSR1}$ (115) that are up-to-date in his account.

Functional framework for supporting the Avatars delegated by the User (30).

Functional framework for all the account management of a user:

Register of all the synchronization and Digital Fingerprints$_{CSR1}$ (207) of a Digital Content$_{CSR1}$ (115), of which there exists a copy in digital devices of the user, and which are as follows:

Register of all the Clone Avatars available to the User (30) and hosted in the digital device of the user.

Other management functionalities of the user.

On the side of the author of digital contents and the authorized media:

Functional framework for the management and publication of Digital Contents (114).

Other management functionalities of the Author/Authorized Media.

On the management side:

Allow the user to access the various payment platforms for acquiring Digital Content$_{CSR1}$ (115).

Provide payment to a user/author in monetary units.

Catalog of Digital Contents$_{CSR1}$ (115) published in firsthand, secondhand, rental, or exchange.

Management of the users' accounts.

Management of the transaction of Digital Content$_{CSR1}$ (115) between users.

On the Service side:

Service logic for undertaking the transformation of Digital Content (114) into Digital Content$_{CSR1}$ (115).

Service logic for allowing all the distribution scenarios.

Reception and processing of the callback of the Avatars that communicates with the system.

Integration with payment platforms.

API for integration with third-party platforms.

Reproduction-Visualization-Execution of Digital Contents with a Virtual Secure Container of Relationship of Rights of the Author and Consumer The software in charge of playing, visualizing or executing a digital content with a virtual secure container of relationship of rights of the author and consumer must be registered previously in the Master Avatar residing in the digital device and/or system. After the Master Avatar validates the software as secure and registers it with secure and reliable software, it will be possible to establish communication connections.

For the software proceeding to the reproduction-visualization-execution of a digital content—with a virtual secure container of relationship of rights of the author and consumer—to be able to do the decryption of Digital Content$_{CSR1}$ (115), it will get its Digital Fingerprint$_{CSR1}$ (207); and with the resulting digital fingerprint it will communicate with Master Avatar residing in the digital device and/or system. That communication is done always in a secure way and must be authenticated with its digital signature.

Through the communication channel between the software of reproduction-visualization-execution and the Master Avatar residing in the digital device, and starting with the Digital Fingerprint$_{CSR1}$ (207) sent by the software of reproduction-visualization-execution to the Master Avatar, this one will send the key to enable decryption of the digital content with a virtual secure container of relationship of rights of the author and consumer.

Copyright Protection Through the Invention

Copyright is always protected by the invention, in the following way:

The digital content (114) is never distributed to a User (30). In the user's digital device there will be, on the contrary, a digital content with a virtual secure container of relationship rights of the author and consumer; in other words, the Digital Content$_{CSR1}$ (115), that being a virtual recursive secure container allows existence of all copies that the user desires to have, in any storage media.

With the Master Avatar (111) and User Avatar (112), virtual links of relationship are established between the Author (10) and the User (30). Therefore, it will only be possible to run the content by a user who has bought it through the System (100), because even if the Digital Content$_{CSR1}$ (115) was copied to other user, the User Avatar (112) will not have the key to be able to do of the Digital Content$_{CSR1}$ (115). When the user creates an account in the System (100) the Master Avatar (111) and User Avatar (112) are registered, and both the Master Avatar and User Avatar will only be able to dialogue between them and their respective avatars, cloned in as many digital devices of that same user, and registered in the System (100).

To enable any secondhand distribution, exchange, rental, or temporary cession/gift, the Master Avatar (111) residing in the digital device of the user synchronizes with all the Avatars cloned in other devices, and removes the Digital Fingerprint$_{CSR1}$ (207) of Digital Content$_{CSR1}$ (115) that is to be sold in secondhand, exchange, rental, temporary cession or as a gift. If the synchronization is not successful, the distribution is not done; the distribution demanded by the user is done only when there is synchronization of all the Avatars keeping an instance of Digital Fingerprint$_{CSR1}$ (207) of Digital Content$_{CSR1}$ (115). In the System (100) and in the Master Avatar (111) User Avatar (112) there is a register of synchronizations with the Clone Avatars and of which digital devices of the user keep that digital fingerprint, so that the user can connect those devices and in this way proceed to delete in them that digital fingerprint.

Preservation of Consumer Rights Through the Invention

The consumer rights are preserved by the invention in the following way:

Consumers can make as many copies as they wish, in any digital device presenting both a Clone Master Avatar (121) and a Clone User Avatar (122) of the consumer.

No limitations exist by the System (100) as regards reproduction-visualization-execution; the only limitations are those of the software that allows for the reproduction-visualization-execution of a digital content with virtual secure container of relationship rights of the author and consumer.

Consumers can choose from the various distribution scenarios of secondhand, exchange, rental, temporary cession or gift of Digital Content$_{CSR1}$ (115).

The invention claimed is:

1. A method to generate a virtual recursive secure container and to generate a virtual secure container of relationship of rights that generate virtual links for relationships, the method comprising:
    using Input data Objects to generate a virtual recursive secure container comprising a Digital file, a Recursive Secure Container Model, and a List of External Encryption Keys;
    creating Output data Objects comprising a Protected digital file, a Digital fingerprint of the protected digital file, a List of encryption keys without an iterative secure container, and a List of encryption keys within iterative secure container;
    using logical components to generate a virtual recursive secure container comprising:
        I) a Logic Controller of a Virtual Recursive Secure Container Generator, containing the functional logic for creating virtual links of relationship to the digital file;
        II) a Symmetric/Asymmetric Encrypter that performs symmetric/asymmetric encryption in a header, data and the digital file;
        III) a Symmetric/Asymmetric Encrypter of Text/Keys that performs symmetric/asymmetrical encryption of at least one of the external encryption keys, randomly-generated encryption keys, and text;
        IV) a Symmetric/Asymmetric Key Generator that generates random symmetric/asymmetric encryption keys; and
        V) a Cryptographic Summary Generator that calculates the digital fingerprint,
    setting virtual links of relationship to a digital file by creating iterative secure containers for both the digital file and encryption keys to generate virtual recursive secure containers;
    encrypting each iterative secure container using symmetric or asymmetric encryption techniques for each iteration;
    creating a set of virtual links for relationships between avatars, each avatar representing at least one entity in the virtual secure container of relationship of rights;
    using a list of encryption keys without iterative secure container and a list of encryption keys within an iterative secure container obtained from generating the virtual recursive secure containers;
    each avatar custodying in a unique and secure way at least one of the encryption keys related to the digital fingerprint of the protected file and running either in one or more user's digital devices with access to public networks or in a system or in both those devices and that system;
    running one or more clone avatars in one or more user's digital devices without access to public networks;
    establishing virtual links for relating between entities through a distribution in a unique way of at least one of the encryption keys related to the digital fingerprint of the protected file to each one of the avatars to create the virtual secure container of relationship of rights;
    distributing in a unique way at least one of the encryption keys associated with the digital fingerprint of the protected file to each of the avatars; and
    generating different types of relationship of rights by redistributing in a unique way at least one of the encryption keys related to the digital fingerprint of the protected file between some avatars that give the relationship of rights to other avatars that receive that relationship of rights.

2. The method according to claim 1, wherein the Logic Controller of the Virtual Recursive Secure Container Generator comprises the following functional components:
    a Data Objects Structure which is a data structure that maintains the dynamic evolution of the transformation of each data object in each iteration;
    an Input Data Analyzer that validates the correctness of the input data;
    a Data Objects Controller managed by the Data Objects Structure, that prepares the data objects; and
    a Data Objects Updater that updates the Data Objects Structure with the state of transformation of all data objects at the end of an iteration;

And the following functional logic:
  a) validation of correct input data with the Input Data Analyzer; that if incorrect, returns an error;
  b) create/update and manage the Data Objects Structure and determine/prepare the data objects to be processed in the current iteration with Data Objects Controller;
  c) a set of logics of decision that determine the action to be performed as defined in the current iteration of the Recursive Secure Container Model, the set of logics comprising:
     I) if to obtain the symmetric/asymmetric key randomly with the Symmetric/Asymmetric Key Generator or through external keys;
     II) if to perform symmetric encryption techniques on the header of the digital file;
     III) if to perform symmetric encryption techniques on data of the digital file;
     IV) if to perform symmetric encryption techniques on the complete digital file;
     V) if to perform symmetric encryption techniques on an encryption key;
     VI) if to perform with asymmetric encryption techniques encryption on the header of the digital file;
     VII) if to perform with asymmetric encryption techniques encryption on data of the digital file;
     VIII) if to perform with asymmetric encryption techniques encryption on the complete digital file; and
     IX) if to perform with asymmetric encryption techniques encryption on an encryption key;
  d) updating of the Data Objects Structure with the state of transformation of all data objects, and if a random symmetric encryption key is created, adding a new entry or if it is an asymmetric key, adding two new entries (public/private) with the Data Objects Updater; and
  e) determining if to end the encryption sequence defined in the Recursive Secure Container Model by:
     I) if another iteration, then return to point b of the described functional logic; and
     II) if end of iterations, then generate a digital fingerprint of the protected digital file with the Cryptographic Summary Generator, and end.

3. The method according to claim 1, wherein the digital file is an electronic book, a digital video file, a digital music file, a computer application or any digital file in need of a digital device to be used.

4. The method according to claim 1, wherein the data object in which to apply an encryption technique to perform encryption in an iteration is: the header of the digital file, or the data of the digital file, or the entire digital file, or an encryption key, or a part of those data objects.

5. The method according to claim 1, wherein the Recursive Secure Container Model defines a sequence of symmetric/asymmetric encryptions and indicates at each iteration: the data object, the symmetric/asymmetric encryption technique to be used, and the encryption key, if it is external or randomly generated by a Symmetrical/Asymmetrical Key Generator.

6. The method according to claim 1, in which the external keys define a list of encryption keys, and each encryption key is associated with a unique identifier, and the unique identifier is used in the Recursive Secure Container Model to identify the encryption key to be used in an iteration.

7. The method according to claim 1, wherein the symmetric/asymmetric encryption key is randomly generated, each encryption key has a unique identifier, and for each asymmetric encryption the encryption key to be used to perform encryption on the current iteration, and if the public key or the private key should be used, is indicated by the Recursive Secure Container Model.

8. The method according to claim 1, wherein the protected digital file is a digital file with iterative symmetric/asymmetric encryption in at least one of the header of the digital file, data in the digital file, and the entire digital data file.

9. The method according to claim 1, involving cryptographic summary techniques where the logic assigns to the protected file a digital fingerprint obtained after applying a cryptographic summary technique with the Cryptographic Summary Generator.

10. The method according to claim 1, wherein the list of encryption keys without iterative secure container are keys without symmetric/asymmetric encryption, and the list of encryption keys with an iterative secure container are keys in which symmetric/asymmetric encryptions have been made iteratively.

11. The method according to claim 1, wherein decrypting the virtual recursive secure container is performed using symmetric/asymmetric decoding in reverse order as the symmetric/asymmetric encryptions applied were performed to generate the iterative secure containers, and a symmetric or asymmetric decryption is performed as indicated by each iteration.

12. The method according to claim 1, wherein the user's digital device with access to public networks is a personal computer, a laptop, a digital music or video device, an e-book reader, a mobile phone or a tablet, and the user's digital device has access to a public communications network.

13. The method according to claim 1, wherein the user's digital device without access to a public network is a digital music device, eBook, a mobile phone or a tablet, and only has access to a local communications network and communicates with a user's digital device with access to public networks.

14. The method according to claim 1, wherein the avatar is a non-interactive computer process running in the background and is not directly controlled by the user, and each avatar represents an entity that is part of the virtual secure container of relationship of rights.

15. The method according to claim 1, in which an avatar can implement multiple roles for each role representing an entity, and receives at least one encryption key that will be custodied in a unique and secure way by each of the entities representing the avatar.

16. The method according to claim 1, wherein the virtual links are for relating rights of two entities: an author and a consumer.

17. The method according to claim 16, in which:
  a Master Avatar that represents the author and a User Avatar that represents the consumer are running in either in one or more user's digital devices with access to public networks or in the system or in both those devices and the system, and a Clone Master Avatar and a Clone User Avatar are residing in one or more user's digital devices without access to public networks and a Clone Master Avatar and a Clone User Avatar are residing in one or more user's digital devices without access to public networks.

18. The method according to claim 16, wherein the virtual links for relating rights include more entities, forming a virtual secure container of rights including more entities.

19. The method according to claim 18, wherein an entity is a distributor, a regulatory body, a company, a legal association or any approved medium.

20. The method according to claim 1, wherein the scenarios of relationship of rights are:
- firsthand, when avatars receive for the first time the relationship of rights associated with the digital fingerprint of the protected digital file;
- secondhand or rental, when the relationships of rights of some avatars are transferred to other avatars, where:
  - a) all references to the relationship of rights digital fingerprint of the protected digital file of all avatars where there is such a reference are removed; and
  - b) the relationship of rights associated to the digital fingerprint of the protected digital file is sent to the receiving avatars;
- exchange, when the relationship of rights of some avatars is exchanged with other avatars, where:
  - a) all references to relationship of rights of the digital fingerprint of protected digital files to be exchanged, of all avatars where there is such a reference digital fingerprint, are removed from each of the protected digital files to be exchanged; and
  - b) the relationship of rights associated to the digital fingerprint of each of the protected digital files that are to be switched is sent to the respective receiving avatars;
- temporary transfer/gift or return, when the relationship of rights of some avatars is transferred to other avatars temporarily or indefinitely, where:
  - all references to the relationship of rights of the digital fingerprint of the protected digital file of all avatars where there is such a reference to the digital fingerprint of the protected digital file are removed; and
  - the relationship of rights associated to the digital fingerprint of the protected digital file is sent to the receiving avatars.

* * * * *